(12) United States Patent
Wirth et al.

(10) Patent No.: US 11,889,403 B2
(45) Date of Patent: Jan. 30, 2024

(54) ACCESS CONTROL FOR NETWORK SLICES OF A WIRELESS COMMUNICATION SYSTEM

(71) Applicant: KONINKLIJKE PHILIPS N.V., Eindhoven (NL)

(72) Inventors: Thomas Wirth, Kleinmachnow (DE); Thomas Schierl, Berlin (DE); Lars Thiele, Berlin (DE); Cornelius Hellge, Berlin (DE); Eiko Seidel, Munich (DE)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 18/103,534

(22) Filed: Jan. 31, 2023

(65) Prior Publication Data
US 2023/0189120 A1    Jun. 15, 2023

Related U.S. Application Data

(63) Continuation of application No. 17/524,612, filed on Nov. 11, 2021, now Pat. No. 11,595,877, which is a (Continued)

(30) Foreign Application Priority Data

Jan. 4, 2017 (EP) .................................... 17150279

(51) Int. Cl.
*H04W 48/02* (2009.01)
*H04W 16/02* (2009.01)
*H04W 72/56* (2023.01)

(52) U.S. Cl.
CPC ........... *H04W 48/02* (2013.01); *H04W 16/02* (2013.01); *H04W 72/56* (2023.01)

(58) Field of Classification Search
CPC ..... H04W 48/02; H04W 16/02; H04W 72/00; H04W 88/10; H04W 72/1257;
(Continued)

(56) References Cited

U.S. PATENT DOCUMENTS 6,108,550 A    8/2000 Wiorek et al.
9,538,456 B2   1/2017 Yi et al.
(Continued)

FOREIGN PATENT DOCUMENTS

EP    3566544 B1    11/2019
JP    2009539323 A  11/2009
(Continued)

OTHER PUBLICATIONS

S.I. Lee, et al., 5G Network Slicing Technology, OSIA S&TR Journal, vol. 29, No. 4., Dec. 31, 2016.
(Continued)

*Primary Examiner* — Dung Hong

(57) ABSTRACT

A base station for a wireless communication network comprising a plurality of logical radio access networks, wherein the base station is configured to communicate with a plurality of users to be served by the base station for accessing one or more of the logical radio access networks, and the base station is configured to selectively control the physical resources of the wireless communication network assigned to the logical radio access networks and/or to control access of the users or user groups to one or more of the logical radio access networks, wherein, during a first operation mode of the wireless communication network, the base station is configured to allow access of users or user groups of one or more of the logical radio access networks (e.g., eMBB, URLLC, eMTC), and wherein, during a second operation mode of the wireless communication network, the base station is configured to adaptively limit access of users or
(Continued)

user groups to one or more of the logical radio access networks, and/or adaptively reduce a number of enabled logical radio access networks.

26 Claims, 16 Drawing Sheets

Related U.S. Application Data continuation of application No. 16/459,463, filed on Jul. 1, 2019, now Pat. No. 11,191,003, which is a continuation of application No. PCT/EP2018/050100, filed on Jan. 3, 2018.

(58) Field of Classification Search
CPC ..... H04W 16/04; H04W 84/18; H04W 8/005; H04W 16/18; H04W 72/0493; H04W 4/08
See application file for complete search history.

(56) References Cited

U.S. PATENT DOCUMENTS

| | | | |
|---|---|---|---|
| 2005/0286471 A1 | 12/2005 | Yang et al. | |
| 2010/0112980 A1 | 5/2010 | Horn et al. | |
| 2010/0165910 A1 | 7/2010 | Mathews et al. | |
| 2010/0208658 A1 | 8/2010 | Vesterinen | |
| 2016/0353367 A1* | 12/2016 | Vrzic | H04W 28/0247 |
| 2017/0079059 A1* | 3/2017 | Li | H04W 16/02 |
| 2017/0164349 A1* | 6/2017 | Zhu | H04W 72/51 |
| 2018/0098356 A1* | 4/2018 | Li | H04W 72/20 |
| 2018/0242304 A1* | 8/2018 | Rong | H04W 28/0247 |
| 2018/0276364 A1 | 12/2018 | Keller et al. | |
| 2018/0368140 A1* | 12/2018 | Centonza | H04W 72/27 |
| 2018/0376364 A1* | 12/2018 | Keller | H04W 28/0215 |
| 2019/0007899 A1* | 1/2019 | Vrzic | H04W 8/02 |
| 2019/0014515 A1* | 1/2019 | Zee | H04W 36/0027 |
| 2019/0020996 A1* | 1/2019 | Zhang | H04W 48/18 |
| 2019/0141760 A1* | 5/2019 | Stille | H04W 76/11 |
| 2020/0196186 A1* | 6/2020 | Gupta | H04W 28/0247 |

FOREIGN PATENT DOCUMENTS

| | | |
|---|---|---|
| KR | 20120058121 A | 6/2012 |
| RU | 2488239 C2 | 7/2013 |
| RU | 2497307 C9 | 3/2014 |
| WO | 2007143010 A2 | 12/2007 |
| WO | 2010051504 A1 | 5/2010 |
| WO | 2012172323 A1 | 12/2012 |
| WO | 2014209077 A1 | 12/2014 |
| WO | 2016192636 A1 | 12/2016 |
| WO | 2017174447 A1 | 10/2017 |

OTHER PUBLICATIONS

Xuan Zhou, et al., Network Slicing as a Service: Enabling Enterprises' Own Software-Defined Cellular Networks, IEEE Communications Magazine,, Jul. 31, 2016.

Nokia, RACH isolation for Slices(R2-166172), 3GPP TSG-RAN WG2 Meeting #95bis , Oct. 2016.

LTE; Evolved Universal Terrestrial Radio Access; Physical channels and modulation, 3GPP ETSI TS 36.211, version 13.1.0, Release 13, Apr. 2016 , Apr. 2016.

"Network Functions Virtualisation (NFV)", ETSI GS NFV, V1 .1.1, Oct. 2013 , Oct. 2013.

* cited by examiner

ACCESS CONTROL FOR NETWORK SLICES OF A WIRELESS COMMUNICATION SYSTEM

CROSS-REFERENCE TO RELATED APPLICATIONS

This application is a continuation of copending U.S. patent application Ser. No. 17/524,612 filed Nov. 11, 2021 which is continuation of U.S. patent application Ser. No. 16/459,463, filed Jul. 1, 2019, which in turn is a continuation of copending International Application No. PCT/EP2018/050100, filed Jan. 3, 2018, which is incorporated herein by reference in its entirety, and additionally claims priority from European Application No. 17150279.2, filed Jan. 4, 2017, which is also incorporated herein by reference in its entirety.

The present invention concerns the field of wireless communication systems, such as a mobile communication network. Embodiments of the present invention relate to the access control of network slices implemented in a wireless communication system.

BACKGROUND OF THE INVENTION

Conventionally, different services use a corresponding number of dedicated communication networks, each tailored to the respective service to be implemented. Instead of using a plurality of specifically designed networks, another approach, known as network slicing, may use a single network architecture, like a wireless communication network, on the basis of which a plurality of different services is implemented.

FIG. 1 is a schematic representation of a system for implementing different services using the concept of network slices. The system includes physical resources, like a radio access network (RAN) 100. The RAN 100 may include one or more base stations for communicating with respective users. Further, the physical resources may include a core network 102 having, e.g., respective gateways for connections to other networks, a mobile management entity (MME), and a home subscriber server (HSS). A plurality of logical networks #1 to #n, also referred to as network slices, logical networks or subsystems, are implemented using the physical resources depicted in FIG. 1. For example, a first logical network #1 may provide a specific service to one or more users. A second logical network #2 may provide for an ultra-low reliable low latency communication (URLLC) with users or equipment. A third service #3 may provide general mobile broadband (MBB) services for mobile users. A fourth service #4 may provide for a massive machine type communication (mMTC). A fifth service #5 may provide health services. Yet further services #n, to be determined, may be implemented using additional logical networks. The logical networks #1 to #n may be implemented at the network side by respective entities of the core network 102, and access of one or more users of the wireless communication system to a service involves the radio access network 100.

FIG. 2 is a schematic representation of an example of the wireless network 100 or wireless network infrastructure of the wireless communication system of FIG. 1. The wireless network 100 may include a plurality of base stations $eNB_1$ to $eNB_5$, each serving a specific area surrounding the base station schematically represented by the respective cells $106_1$ to $106_5$. The base stations are provided to serve users within a cell. A user may be a stationary device or a mobile device. Further, the wireless communication system may be accessed by IoT devices which connect to a base station or to a user. IoT devices may include physical devices, vehicles, buildings and other items having embedded therein electronics, software, sensors, actuators, or the like as well as network connectivity that enable these devices to collect and exchange data across an existing network infrastructure. FIG. 2 shows an exemplary view of only five cells, however, the wireless communication system may include more such cells. FIG. 2 shows two users UE1 and UE2, also referred to as user equipment (UE), that are in cell $106_2$ and that are served by base station $eNB_2$. Another user $UE_3$ is shown in cell $106_4$ which is served by base station $eNB_4$. The arrows $108_1$, $108_2$ and $108_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$. Further, FIG. 2 shows two IoT devices $110_1$ and $110_2$ in cell $106_4$, which may be stationary or mobile devices. The IoT device $110_1$ accesses the wireless communication system via the base station $eNB_4$ to receive and transmit data as schematically represented by arrow $112_1$. The IoT device $110_2$ accesses the wireless communication system via the user $UE_3$ as is schematically represented by arrow $112_2$.

The wireless communication system may be any single-tone or multicarrier system based on frequency-division multiplexing, like the orthogonal frequency-division multiplexing (OFDM) system, the orthogonal frequency-division multiple access (OFDMA) system defined by the LTE standard, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used.

For data transmission, a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink control channel (PDCCH) carrying for example the downlink control information (DCI), etc. For the uplink, the physical channels may further include the physical random access channel (PRACH or RACH) used by UEs for accessing the network once a UE synchronized and obtained the MIB and SIB. The physical signals may comprise reference signals (RS), synchronization signals and the like. The resource grid may comprise a frame having a certain duration, e.g. a frame length of 10 milliseconds, in the time domain and having a given bandwidth in the frequency domain. The frame may have a certain number subframes of predefined length, e.g., 2 subframes with a length of 1 millisecond. Each subframe may include two slots of 6 or 7 OFDM symbols depending on the cyclic prefix (CP) length. The PDCCH may be defined by a pre-defined number of OFDM symbols per slot. For example, the resource elements of the first three symbols may be mapped to the PDCCH.

The above described wireless communication system may be a 5G wireless communication system which may allow network slicing. As mentioned above, the logical networks or slices are implemented at the network side 102, but there is also an effect on the radio access network 100. The resources provided by the radio access network 100 are shared between the respective slices, for example, they are assigned dynamically by a scheduler of a base station. At the radio access network 100, for one or more of the slices #1 to #n, which may use a different numerology, respective logical radio access networks $114_1$ to $114_n$ are defined. A logical radio access network defines for a certain slice the resources of the radio access network 100 to be used. For example, for one or more different services, in the frequency domain, a certain subband or a certain number of carriers of the radio access network 100 may be used. In accordance with other examples, the physical separation may be in time, code or spatial domains. In spatial domain, separation may be performed using special beamforming techniques. Such a separation may be used for services using different numerologies, e.g., different physical layer parameters such as subcarrier distance, cyclic prefix length, modulation or access scheme. For services using the same numerology different predefined physical resource blocks may be used.

FIG. 3 is a schematic representation of a plurality of logical radio access networks or logical RANs $114_1$ to $114_4$, also referred to in the following as RAN subsystems, for a wireless communication system implementing the logical networks or subsystems #1 to #4. FIG. 3 assumes services implemented by respective subsystems #1 to #4 using different numerologies which are physically separated in the frequency domain. FIG. 3 schematically represents a part of physical resource grid to be used. Each of the logical RANs $114_1$ to $114_2$ to be used for a specific subsystem #1 to #4 has assigned a certain bandwidth or a number of continuous carriers in the frequency domain. In accordance with other examples, a service may have assigned multiple subbands or different carriers. FIG. 3 schematically represents the transmission of downlink control information 116 for the respective subsystems #1 to #4. The control information 116 for all of the subsystems #1 to #4 is transmitted only on the resources for the subsystem #3. The control information 116 may include the control channels and control signals, e.g., the synchronization signals, the common reference symbols, the physical broadcast channel, the system information, paging information and the like. Instead of transmitting control information for each of the subsystems #1 to #4, the control information 116 is only transmitted once on the resources of the subsystem #3. The subsystems #1, #2 and #4 also listen to these resources to see whether any control information form them is transmitted. In the example of FIG. 3, the logical RANs $114_1$ to $114_4$ are provided for specific subsystems #1 to #4, namely for subsystems providing an enhanced mobile broadband (eMBB) service, an ultra-low reliable low latency communication (URLLC), an enhanced massive machine type communication (eMTC), or another service not yet specified. Providing the control information 116 in a way as depicted in FIG. 3 is resource efficient as only one transmission is needed for all subsystems #1 to #4, instead of transmitting separate control information for each of the subsystems #1 to #4 via the respective the logical RAN $114_1$ to $114_4$.

FIG. 3 refers to the resource sharing during the downlink. However, the resources may also be shared during the uplink. For example, during a connection setup, the resources for the random access channel (RACH) may be shared, e.g., like in the downlink also in the uplink the RACH information is only transmitted on the resources of the subsystem #3. For example, the control information 116 may indicate the common uplink random access resources to be used for the random access procedure. The RACH may be operated at relatively low load to avoid collisions and thus multiple transmissions and added latency. For example, a four-step RACH procedure may be used, as it is illustrated in FIG. 4. In a radio access network, such as the one depicted in FIG. 2, a UE, after sending an uplink random access preamble ① in the uplink, monitors for a random access response message ② from the base station generated by the MAC layer and transmitted on the shared channel. Dependent on the cause of the RACH message, for example, an initial connection set-up using a radio resource control (RRC) connection request or a request for re-establishing a connection, different RRC messages may be sent in the uplink. Following the access, respective scheduled transmissions ③ are performed. There may be a further response message ④ from the base station to resolve collisions with other UEs that may happen during the access procedure.

Mobile communication systems may also provide for an access control so as to control the access of UEs to the system, e.g., to the entire system or only to one or more cells of the system to avoid congestion and overflow. One mechanism is the so-called access class barring (ACB), in accordance with which certain cells limit access to certain classes of UEs. ACB is broadcast by the base station of the cell to control the random access procedure. Other congestion control mechanisms, such as an RRC reject or a Non-access stratum (NAS) reject, may involve additional signaling at the RRC layer, the NAS layer or a higher layer. In such a case, the fully overloaded system may not even be capable transmitted successfully such a control signaling, despite its usually high priority. For example, in accordance with the LTE standard, ACB provides means to control access of regular devices with access classes 0 to 9, and to limit access to only special access classes, for example to:

| | |
|---|---|
| special AC 11 | Reserved for Network Operator |
| special AC 12 | Security Services (police, surveillance, etc.) |
| special AC 13 | Public Utilities (water, gas, electricity, etc.) |
| special AC 14 | Emergency Services |
| special AC 15 | Network Operator Staff (maintenance, etc.) |

AC 10 may control as to whether any emergency calls are allowed for regular devices or not.

There may be another congestion and overload control mechanisms defined at the radio and network levels. For example, the following admission and overload control mechanisms are defined by the LTE standard:

| | |
|---|---|
| Radio Rel.8 | eNB Access Class Barring (idle UEs) |
| Radio Rel.8 | RRC Reject Message (connected UEs) |
| NW Rel.8 | NAS reject message or data throttling |
| Radio/NW Rel.9 | Service Specific Access Control (SSAC) |
| Radio/NW Rel. 12 | Skip Access Class Barring for MMTel |
| Radio/NW Rel. 13 | Application specific congestion control |

In other wireless communication network systems, such as the 5G wireless communication system, a single or common access control scheme may be used. As long as a wireless communication system operates under standard circumstances, it is beneficial to share the resources among the respective logical RANs, as explained above, however, sharing resources among the network slices may not be efficient in each and every situation in which a network is operated.

SUMMARY

An embodiment may have a base station for a wireless communication network comprising a plurality of logical radio access networks, wherein: the base station is configured to communicate with a plurality of users to be served by the base station for accessing one or more of the logical radio access networks, and the base station is configured to selectively control the physical resources of the wireless communication network assigned to the logical radio access networks and/or to control access of the users or user groups to one or more of the logical radio access networks wherein, during a first operation mode of the wireless communication network, the base station is configured to allow access of users or user groups of one or more of the logical radio access networks (e.g., eMBB, URLLC, eMTC), and wherein, during a second operation mode of the wireless communication network, the base station is configured to adaptively limit access of users or user groups to one or more of the logical radio access networks, and/or adaptively reduce a number of enabled logical radio access networks.

Another embodiment may have a wireless communication network, comprising: one or more base stations for a wireless communication network comprising a plurality of logical radio access networks, wherein: the base station is configured to communicate with a plurality of users to be served by the base station for accessing one or more of the logical radio access networks, the base station is configured to selectively control the physical resources of the wireless communication network assigned to the logical radio access networks and/or to control access of the users or user groups to one or more of the logical radio access networks wherein, during a first operation mode of the wireless communication network, the base station is configured to allow access of users or user groups of one or more of the logical radio access networks (e.g. eMBB, URLLC, eMTC), and wherein, during a second operation mode of the wireless communication network, the base station is configured to adaptively limit access of users or user groups to one or more of the logical radio access networks, and/or adaptively reduce a number of enabled logical radio access networks; a plurality of user equipments; wherein the wireless communication network is configured to enable a plurality of logical radio access networks, and to provide a plurality of physical resources for a wireless communication among a base station and a plurality of users to be served by the base station.

Another embodiment may have a method in a wireless communication network comprising a plurality of logical radio access networks, wherein a base station communicates with a plurality of users to be served by the base station for accessing one or more of the logical radio access networks, the method comprising: selectively controlling, by the base station, the physical resources of the wireless communication network assigned to the logical radio access networks and/or controlling, by the base station, access of the users or user groups to one or more of the logical radio access networks wherein, during a first operation mode of the wireless communication network, the base station allows access of users or user groups of one or more of the logical radio access networks (e.g. eMBB, URLLC, eMTC), and wherein, during a second operation mode of the wireless communication network, the base station adaptively limits access of users or user groups to one or more of the logical radio access networks, and/or adaptively reduces a number of enabled logical radio access networks.

Another embodiment may have a non-transitory digital storage medium having a computer program stored thereon to perform, when executed by a computer, a method in a wireless communication network, the wireless communication network comprising a plurality of logical radio access networks, wherein a base station communicates with a plurality of users to be served by the base station for accessing one or more of the logical radio access networks, and the method comprising: selectively controlling, by the base station, the physical resources of the wireless communication network assigned to the logical radio access networks and/or controlling, by the base station, access of the users or user groups to one or more of the logical radio access networks, wherein, during a first operation mode of the wireless communication network, the base station allows access of users or user groups of one or more of the logical radio access networks (e.g. eMBB, URLLC, eMTC), and wherein, during a second operation mode of the wireless communication network, the base station adaptively limits access of users or user groups to one or more of the logical radio access networks, and/or adaptively reduces a number of enabled logical radio access networks.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
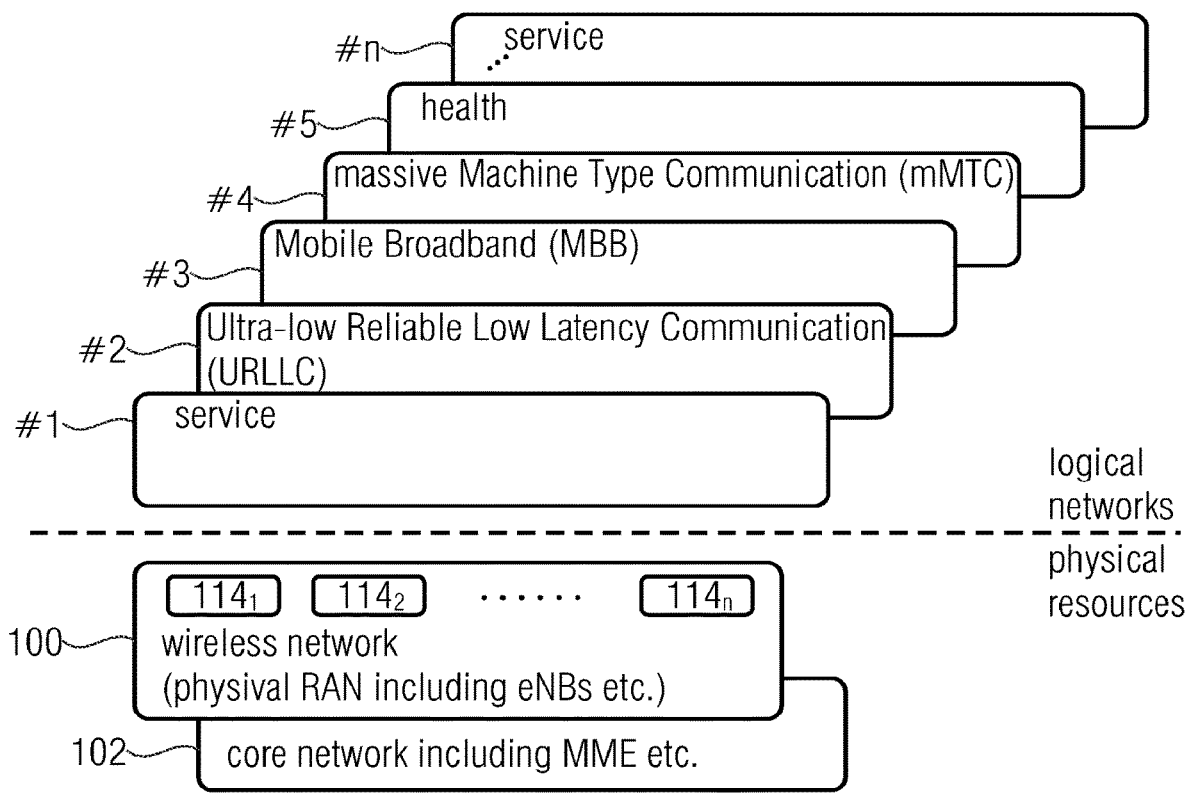
FIG. 1 is a schematic representation of a system for implementing different services using the concept of network slices.

In the following, embodiments of the present invention are described in further detail with reference to the enclosed drawings in which elements having the same or similar function are referenced by the same reference signs.

As mentioned above, when a wireless system operates regularly, the above described sharing of the resources is beneficial. However, there may be situations in which such sharing needs tighter control, for example, in response to specific events or at specific times. In accordance with the present invention the physical resources of the wireless communication network assigned to the logical radio access networks are selectively controlled, and/or access of the users or user groups to one or more of the logical radio access networks is controlled. More specifically, embodiments of the present invention introduce a more flexible handling of resources for an access control (first and second aspects) and for the configuration of the RACH resources (third aspect).

In accordance with the first aspect, a subsystem specific access control is described, and in accordance with the second aspect, the system information is split into a first part, which is referred to as basic access control (BAC) and defines general access control parameters, and into a second part, which is referred to as detailed access control (DAC) and defines subsystem specific access control parameters. In accordance with the third aspect a dynamic RACH resource sharing/isolation is described. It is noted that all aspects and embodiments may be combined and used together, except they are mutually exclusive.

First Aspect

In accordance with embodiments of the first aspect of the present invention, the common downlink system information, for example, the broadcast channel may be used to adaptively control access to the respective subsystems, via the associated logical radio access networks.

When the wireless communication system operates in a first operation mode, access to all of the subsystems may be allowed. When the wireless communication system operates in a second operation mode, in accordance with the inventive approach, the number of subsystems to which access is allowed and/or the number of users allowed to access the system may be limited. The access control may be performed by a base station of a cell, when the wireless communication system is in the second operation mode in which access control is desired. For example, this may be the case in an emergency or when specific events occur or at specific days or times. Further, the wireless communication system may cover a large geographical area, and the access control may not be needed in the overall area covered but only in one or more subareas or cells in which the event occurred. In such a case, only the base stations serving the cells or defining a subarea may perform the inventive access control. Base stations in other areas may operate without the inventive access control, i.e., the resources are shared among all subsystems implemented. In the other areas, the system operates in the first operation mode, which may be a regular mode. In specific cases, such as nation-wide emergency cases, the entire wireless subsystem may operate on the basis of the inventive access control approach. When not all of the base stations or cells are operated in accordance with the inventive access control approach, users at the edge of a cell or a subarea for which the limited access control is performed, may try to access the desired subsystem in neighboring cells, provided this is allowed and sufficient connectivity is given.

As mentioned above, in accordance with embodiments, the switching from the first operation mode to the second operation mode may occur responsive to predefined events, such as emergency situations, overload situations, special events, specific minimum requirements of one or more of the subsystems operated, or a certain day or time.

Figure 5:
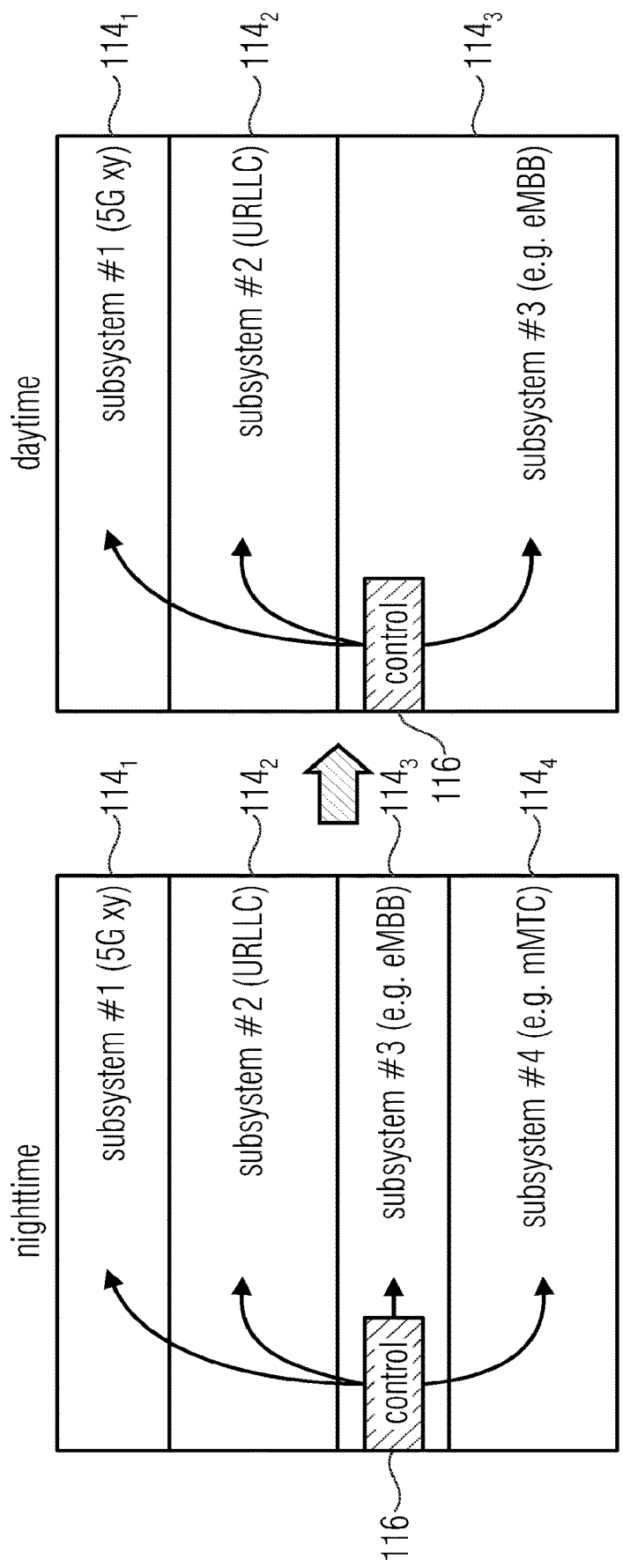
FIG. 5 shows an embodiment for prioritizing eMBB operations over mMTC operations during the daytime.

FIG. 5 shows an embodiment for prioritizing eMBB operations over mMTC operations during the daytime. On the left, FIG. 5 schematically represents the access control during the nighttime, during which access is allowed to all of the subsystems #1 to #4. During the daytime, however, control is restricted to subsystems #1 to #3. The physical resources, which are assigned to the logical RAN $114_4$ for the subsystem #4 during the night time, are assigned to the logical RAN $114_3$ for the subsystem #3 during the daytime, i.e., the mMTC subsystem is no longer accessible. In accordance with embodiments, access control is achieved by no longer scheduling any resources for the radio access to the subsystem #4, i.e., the logical RAN $114_4$ is no longer present. The embodiment of FIG. 5 is advantageous as it allows a delay un-critical service, as provided by the mMTC subsystem #4, to be temporarily barred so as to limit this service to a specific time, like the nighttime, during which the massive machine type communications may be performed. For example, sensors or machines which provide data that is not time critical may be read out via the wireless communication system once a day. During the daytime, this allows for an increase in the available resources that may be used for the other subsystems. In the embodiment of FIG. 5, while the resources associated with the subsystems #1 and #2 remain the same, the resources associated with the eMBB subsystem #3 are increased.

In accordance with further embodiments, one or more of the respective subsystems may be further differentiated, for example, in terms of different service qualities of a service provided by the respective subsystem. For example, when considering the eMBB subsystem, some services provided by this subsystem may include the transmission of specific data, such as video data, in different service qualities. Services may provide video content to users with a high quality so as to fulfill the user experience when downloading video information, whereas other services, such as security services, provide video information with a quality that depends, for example, on whether a specific event needs more details of the scene currently recorded or as to whether only a surveillance to monitor an area for moving objects is performed. Dependent on such services, the subsystem may be further differentiated into bandwidth classes, and for different service qualities respective bandwidth may be assigned so that the different service qualities may be prioritized. The specific access control class (AC class) may be signaled to the UEs together with additional information about the video qualities available, which may be different for different users. In other words, according to embodiments, to limit or suspend one or more services using the logical radio access network the base station may select for one or more users or user groups of a service a certain service quality from different service qualities, like video quality, and/or bandwidth, and/or latency, e.g., in terms of number of resources grants in a given time interval.

The embodiment as described with reference to FIG. 5 allows for gradually evacuating the wireless communication system such that specific services on existing connections may be scaled-down or even terminated. This may be achieved by using specific signaling protocols. For example, in order to offload video users in case of emergency events, a signaling is provided to regular users to "stop streaming/requesting new data" for example, by using a DASH SAND message. Further, if one or more of the subsystems demands a higher capacity, for example, in case a PPDR (PPDR=public protection and disaster relief) UE requests high data rates without terminating other subsystems, the DASH SAND message may be used in an existing DASH session so as to scale down the video service. A similar mechanism may be applied for other services, for example, to terminate or limit software updates, e.g., sessions with online stores. The particular DASH SAND message may be triggered by a network entity, such as the HSS (home subscriber register) the MME or the DANE (Dash Aware Network Element), or it may directly be triggered by the base station. In case scaling down is not sufficient, the inventive approach for controlling access may completely shut down subsystems by admission control on other layers.

In the embodiments described above, it has been described that one specific subsystem, like the mMTC subsystem #4, may be temporarily barred. The invention is not limited to such embodiments. Other subsystems may be barred dependent on other events, such as other times or dates, on the basis of reoccurring events or in case of an emergency. In the latter case, an example for a subsystem that may be prioritized over other subsystems is the PPDR subsystem. Such a subsystem may be prioritized over the other subsystems in case of an emergency, such as a terrorist attack or a disaster, so as to avoid overload situations in the entire wireless communication system or in affected cells of the system. For example, all or most of the other subsystems may be shut down so that access is only possible to the wireless communication system by PPDR UEs, i.e., regular UEs may not be able to access the system anymore. In accordance with further embodiments, one or more of the subsystems, besides the PPDR subsystem, may remain operative; however, with a lower priority than the PPDR subsystem. For example, the subsystem allowing emergency calls may remain operative; however, to avoid an overflow of the network and the blocking of RACH resources, emergency calls may only be allowed with a priority lower than any communication in the PPDR subsystem.

In the embodiments described so far, access control included the barring of one or more subsystems from access; however, in accordance with further embodiments, access control may also be achieved by gradually reducing the number of UEs that are allowed to access one or more of the subsystems via the respective logical RANs $114_1$ to $114_4$. The control information 116 may signal to a UE a time period during which the subsystem is not accessible, also referred to as a barring time, so as to inform the UE about the next time at which an access is possible. The related access barring back-off parameters may be subsystem-specific parameters. Further, the control information may indicate that a specific subsystem, like the above described mMTC subsystem, is generally supported and that the UE requesting access to such a system stays connected to the network; however, that access is temporarily barred. Once the access is allowed again, the UE can immediately connect to the service provided by the respective subsystem. In accordance with other embodiments, in case the control information signals that the service provided by a specific subsystem is generally supported but temporarily not available, the UE may start a scan for other subsystems providing the same or similar services.

In accordance with the embodiments described so far, a specific event, such as a specific time, date was assumed to trigger the access control; however, in accordance with further embodiments, such events may be reoccurring events. For such reoccurring events an access schedule may be provided as a part of the system information that is, for example, transmitted upon connection set-up via the system information to the UE. The access schedule may indicate, when considering the embodiment of FIG. 5, that during nighttime the mMTC subsystem #4 is available, but not during the daytime. Another reoccurring event is, for example, that people commute during the day and are in the office so that during this time high-speed mobile broadband services as provided by the eMBB subsystem #3 are needed, while during nighttime the needed eMBB capacity may be decreased significantly, thereby freeing resources which may be used for another subsystem, e.g., for a URLLC communication in subsystem #2. In accordance with yet further embodiments, rather than providing the access schedule as a part of the system information, it may also be signaled as part of the control information, for example, a daily schedule about which subsystem is served at what time of the day, may be submitted. Different schedules may be transmitted for different days, for example, weekdays may use a first schedule and weekend days may use a second, different schedule.

Figure 6:
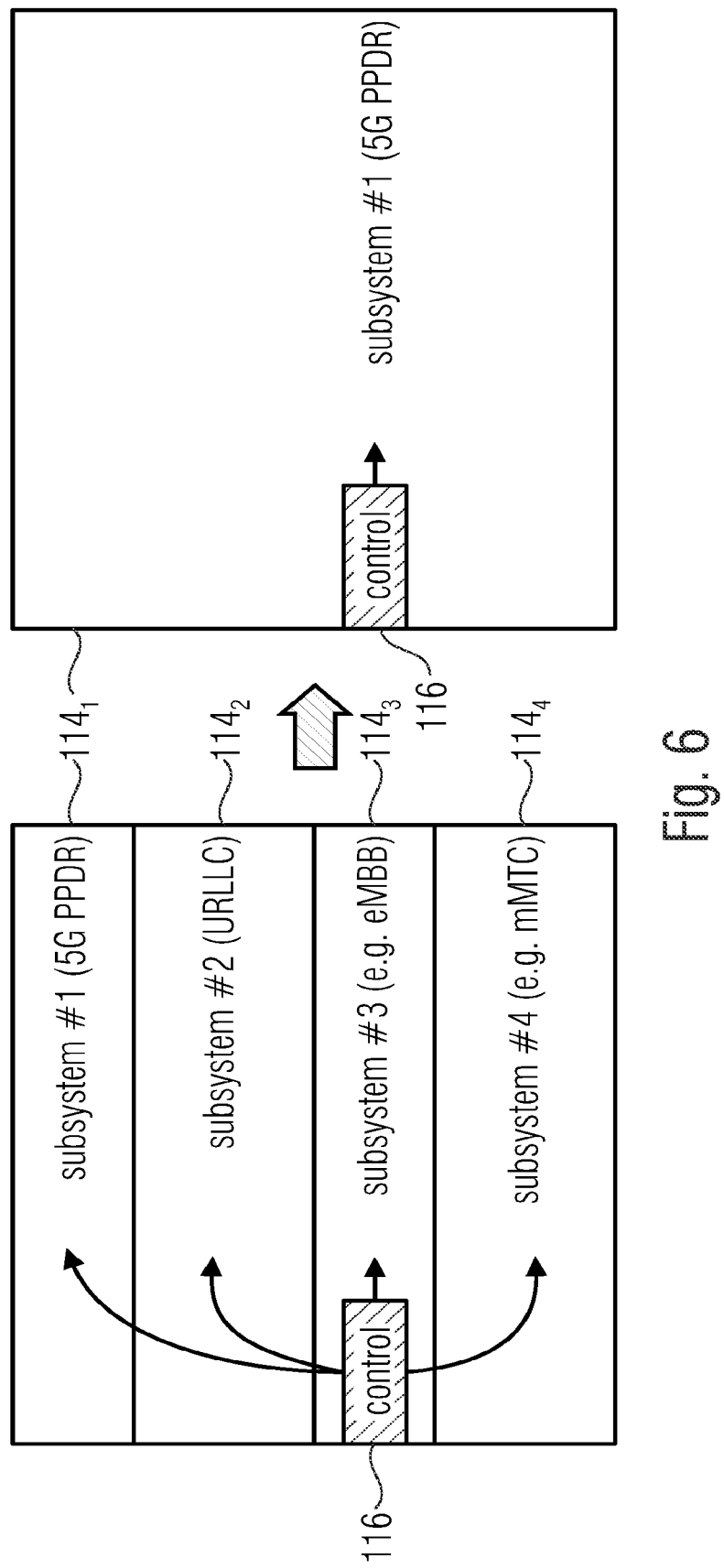
FIG. 6 shows on the left the situation of FIG. 3 assuming a regular operation of the system, i.e., working in a first operation mode, and on the right the configuration of the system when operating in a second operation mode, for example, in case of an emergency.

In the embodiments described above, access to one of the subsystems has been barred; however, in accordance with further embodiments, the inventive access control may limit access to only one subsystem. In accordance with an embodiment, the subsystem #1 accessed via logical radio access network $114_1$ may be a PPDR subsystem. The inventive access control may limit access only to the PPDR subsystem #1 while barring all other subsystems #2 to #4. This is schematically depicted in FIG. 6, which shows on the left the situation of FIG. 3 assuming a regular operation of the system, and on the right the configuration of the system in the second operation mode, for example, in case an emergency occurred. In FIG. 6, responsive to switching the wireless communication system or a part thereof into the second operation mode, access to the subsystems #2 to #4 via the logical RANs $114_1$ to $114_4$ is no longer possible. All resources are scheduled to the logical RAN $114_1$ for accessing the PPDR subsystem #1. Limiting access to one of the subsystems is advantageous as, for example, in the PPDR subsystem #1 mission-critical operations may need a higher bandwidth. For example, HD (high definition) videos may be transmitted permanently from a disaster area or during a mission-critical operation. However, it is not efficient to reserve such a huge amount of resources permanently, while such events may happen only rarely. Further, there is no need to reserve the amount of resources for the entire system permanently as, even in case such an event occurs, it is likely that it is only occurring in a limited region of the area covered by the wireless communication system. Thus, in such exceptional cases, the approach, as explained with reference to FIG. 6, allows providing the PPDR subsystem #1 with a sufficiently large transmission capacity, in case the exceptional situations occur. The outage of the general services to other UEs, in such exceptional cases, may be acceptable.

In the above described embodiments, when specific services are disabled so as to free resources for high priority services, the base station may redirect UEs from the currently used subsystem, which no longer provides the service or provides the service with a reduced quality, to other subsystems still providing the service. In accordance with embodiments, an inter-subsystem handover or redirection signaling to all UEs connected to the subsystem is provided. For example, the UEs of a subsystem may form a group having a specific group or subsystem identity. By signaling the group identity, all of the UEs currently connected or making use of the specific subsystem may be identified and addressed. The signaling may be sent via a paging channel or a common control channel, and part of the signaling may be information about the new or target subsystem to which the UEs are redirected, such as the carrier frequencies, cell identity, access technology type (like FDD or TDD), and/or subframe configuration details of the new subsystem now providing the service.

Now, further embodiments are described for realizing the inventive subsystem based admission control in case of shared resources so as to allow providing resource sharing during a first mode of operation of the system or parts of the system, like a regular operation, and a second mode of operation, like resource isolation, in exceptional cases. The inventive access control may also be referred to as a basic access control (BAC) which may be realized in accordance with the subsequently described embodiments.

In accordance with a first embodiment of the BAC, the control information 116 may include one or more bits, advantageously a single bit. The control information provided by a base station to the UEs is to inform the UEs whether a certain subsystem is supported or not. For example, when considering FIG. 5 and FIG. 6, the control information may include information as represented in the following table:

| Indicator | Meaning |
|---|---|
| eMBB Support | supported/not supported |
| URLLC Support | supported/not supported |
| mMTC Support | supported/not supported |
| PPDR Support | supported/not supported |

In accordance with a second embodiment of the BAC, the control information 116 may include access control information, like a single bit or multiple bits, which indicates that only certain devices, such as UEs or IoT devices, have access to one or more of the subsystems. For example, in case of one of the above mentioned events the wireless communication system, at least in part, operates in the second operation mode. The following table shows an embodiment for a single bit access control information indicating that for specific subsystems only specific UE types are allowed to access or not access, i.e., are barred or not barred.

| Indicator | Meaning |
|---|---|
| Access Control for eMBB devices | UE type barred/not barred |
| Access Control for URLLC devices | UE type barred/not barred |
| Access Control for mMTC devices | UE type barred/not barred |
| Access Control for PPDR devices | UE type barred/not barred |

For example, in FIG. 6 a single bit may limit access to the system only to PPDR devices.

In accordance with other embodiments, the access control information given in the table above may be used to block specific UE hardware or software. In such a case, additional information may be signaled for the access control purpose, for example, the equipment type, such as the IMEI (international mobile equipment identity) or a software version (SV), for example, IMEI-SV. The access control in accordance with this embodiment provides additional functionality included into the radio layers at the UE and at the base station. Conventionally, the UE type is known to the higher layers in the UE, for example, it may be stored on the SIM (scriber identity module) card. In the network, UE type is also known at the higher layer and may be stored in the HSS or the MME. However, conventionally, the UE type is not known at the radio layer of the UE, for example, at the radio resource control (RRC) layer. In accordance with embodiments, for implementing the access control on the basis of the UE type during the connection set-up phase, the RRC layer may consider the UE terminal type during the access control procedure, and the UE RRC layer is informed about the parameter describing the UE type. More specifically, the higher layer (e.g. NAS protocol) of the UE informs the lower layer of the UE either during the connection/call/session set-up phase, or the lower layer (e.g. RRC protocol) may have stored this information from previous procedures, for example, from an initial connection set-up.

In accordance with a third embodiment of the BAC, the control information 116 may include access control information per subsystem. For example, a single bit or multiple bits may made be used to bar a complete subsystem, as indicated in the table below. For example for each subsystem of FIG. 5 and FIG. 6 a single bit indictor may be provided in the control information 116 indicating that the respective subsystem is barred or not barred.

| Indicator | Meaning |
|---|---|
| eMBB Access Control | subsystem barred/not barred |
| URLLC Access Control | subsystem barred/not barred |
| mMTC Access Control | subsystem barred/not barred |
| PPDR Access Control | subsystem barred/not barred |

In accordance with this embodiment, for implementing the inventive access control scheme, the UE radio functions, such as the RRC layer, are made aware of the subsystem that is to be accessed, which may be performed in a way as described above with regard to the second embodiment.

In accordance with a fourth embodiment of the BAC, the control information 116 includes information, like one or more bits, to indicate that additional access control information has to be obtained. The system information that is broadcast to all UEs may be limited, however, when using only a limited number of bits, advantageously a single bit, the additional information that needs to be signaled is reduced. On the basis of this additional information the UEs are requested to obtain additional system information with additional control parameters before actually accessing the subsystem, e.g., via an associated logical RAN. The additional information, as is shown in the table below, indicates, e.g. in the system information, that prior to actually starting the access procedure, additional access class barring information is to be obtained and considered. The additional information to be obtained may be the information described with regard to the first, second and third embodiments of the BAC.

| Indicator | Meaning |
| --- | --- |
| Read Additional Access Class Barring Information* | Access allowed without additional access barring information/Read additional access barring information before accessing the system |
| *maybe limited to certain UE Types, services or subsystems | |

Figure 7:
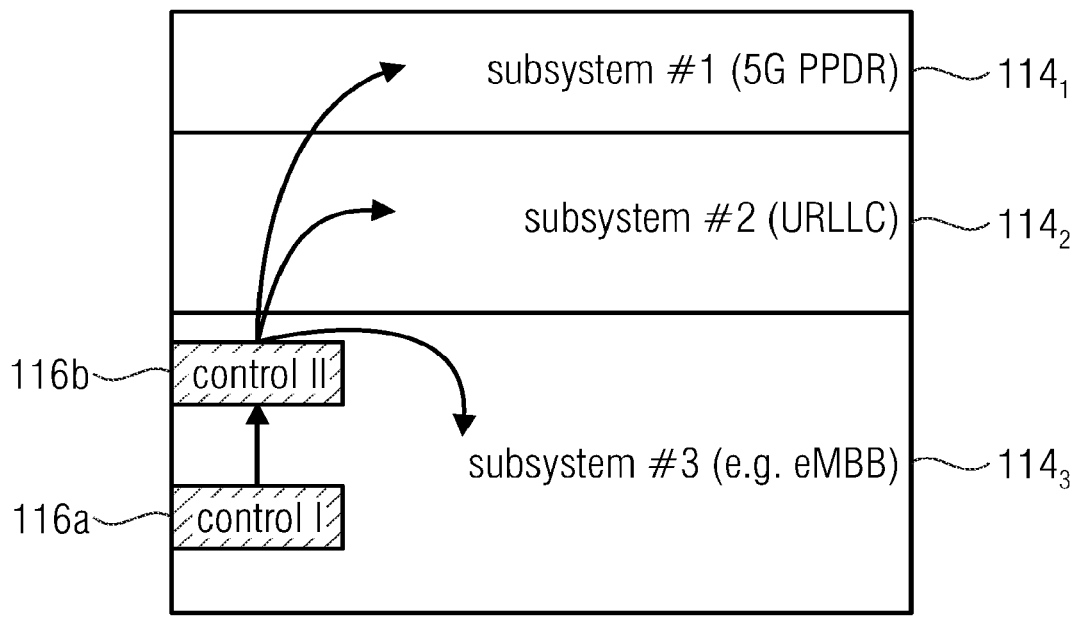
FIG. 7 shows an embodiment for implementing control access on the basis of additional access control information.

FIG. 7 shows an embodiment for implementing the control access on the basis of additional access control information. In FIG. 7, a wireless communication system is assumed which is similar to the one in FIG. 5 and FIG. 6; however, only three subsystems #1 to #3 are implemented. In this embodiment, the PPDR subsystem #1, the URLLC subsystem #2 and the eMBB subsystem #3 are provided, which are accessed via the respective logical RANs $114_1$ to $114_3$. When compared to FIG. 5 and FIG. 6, the control information now includes first control information 116a and second control information 116b. For example, when system information transmitted, for example, via the SIB, the control information 116a may include a bit which, when being set, indicates that the wireless communication system or at least part thereof operates in accordance with the second operation mode. When the bit is set, a UE is not allowed to access the system right away, but needs to obtain additional access class barring information provided by the additional control information 116b. Like in the embodiments described so far, the additional control information 116 for all of the subsystems may be transmitted only on the resources for one of the subsystems, in the depicted embodiment the resources of the subsystems #3.

Figure 7A:
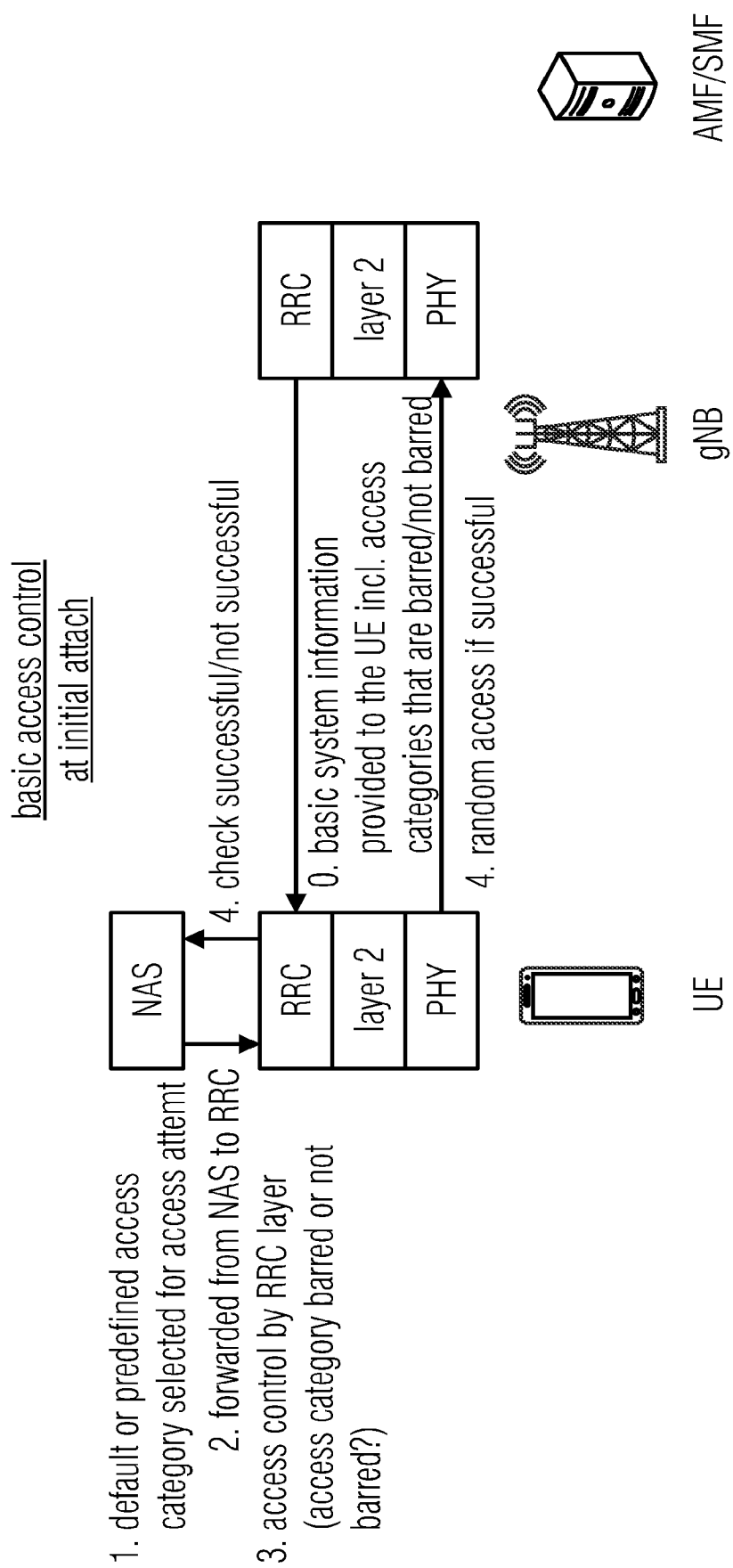
FIG. 7(a) and FIG. 7(b) show another embodiment for implementing control access using a first operational mode executed during an initial attach of the UE, and a second operational mode once the UE is configured with additional access control information by the network.
Figure 7B:
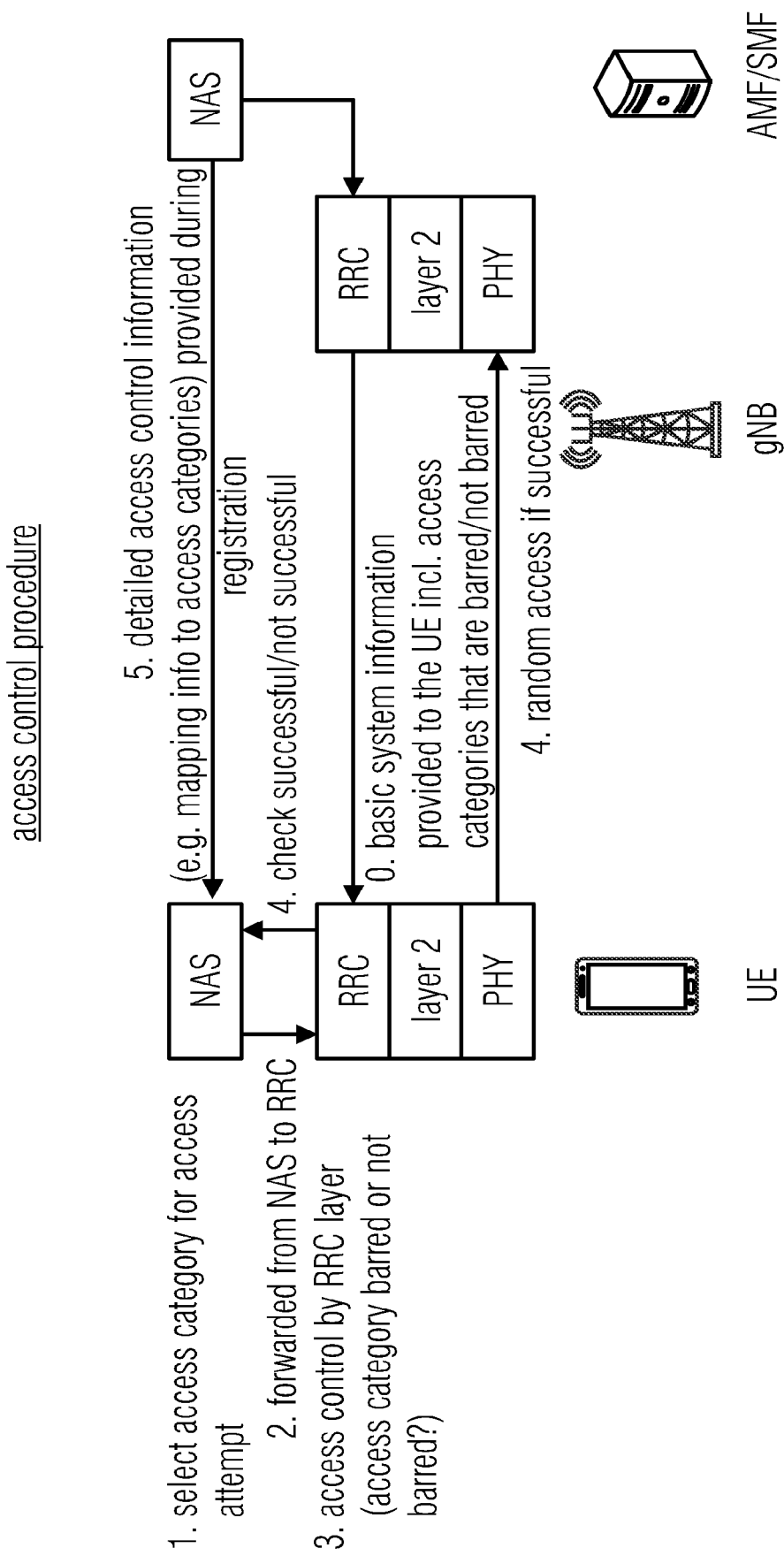

In accordance with another embodiment a first operational mode, using, e.g., the access control based on BAC, is only executed during an initial attach of the UE, see for example FIG. 7(a), while a second operational mode is used once the UE is configured with additional access control information by the network, see for example FIG. 7(b). The additional access control information may be mapping information to map a group identity, a subsystem identity, a certain device type or specific services to a newly defined access category to be used in a second operational mode of access control. This allows a flexible mapping of various parameters to a single parameter that can be used for access control.

During the initial step, after receiving the basic system information from the gNB (see message "0" in FIG. 7(a)), the UE may access the system on a first logical access network or default access network using a first set of access parameters, e.g., a first or default access category (see messages "1" and "2" in FIG. 7(a)). In this initial access attempt the UE does not have a detailed network configuration such as an access category for access control. It may thus use a preconfigured access category, a default access category or a configuration based on the service type but not on the network slice. Once the access category is decided the UE reads the RRC System Information (see messages "3" and "4" in FIG. 7(a)), e.g., which access category is barred and which is not barred, to get to know if it is allowed to access the base station or not (see message "4" in FIG. 7(a)).

Once the UE is connected to the network, the network configures the UE with additional control information 116b (see message "5" in FIG. 7(b)). The additional control information may include slice specific configurations as well as additional access control information such as the mapping information to map a group identity, a subsystem identity, a device type or a service type to an access category. As is shown in FIG. 7(b), such control and mapping information may be provided by a higher layer protocol such as the Non-Access Stratum protocol (NAS). By means of NAS messages are exchanged between the UE and the next generation network via the 5G base station.

After the UE is configured with the mapping information, the UE operates in a second mode. In this mode the UE considers its newly assigned access category in the access control process (see for example FIG. 7(b)). Before accessing the base station, e.g., due to a mobile originating call or session, once again the UE needs to identify the access category that is applicable for this specific access attempt (see messages "0" to "5" in FIG. 7(b)). Due to the flexible configuration, there may be various criteria such as access to a specific network slice, a specific service type, e.g., an emergency call, a specific terminal type etc. Once the access category is known the UE checks the RRC System Information whether this respective access category is barred or not. In accordance with embodiments, the Access Control may be executed.

As is depicted in FIG. 7(a) and in FIG. 7(b), one implementation of this embodiment may use the NAS protocol at the UE to define an access category for the access attempt, while the UEs RRC protocol at the access stratum performs the final barring check. This is done by comparing the access category to the RRC System Information received from the base station indicating the access categories that are barred or are not barred. The barring check therefore involves interactions between the UE NAS and RRC layer that are exchanged via primitives. In case the system is barred temporarily the RRC may check a barring timing during this process. In case the network slices are mapped to access categories, the network may control access to specific slices by changing respective RRC system information in the base station.

Figure 8:
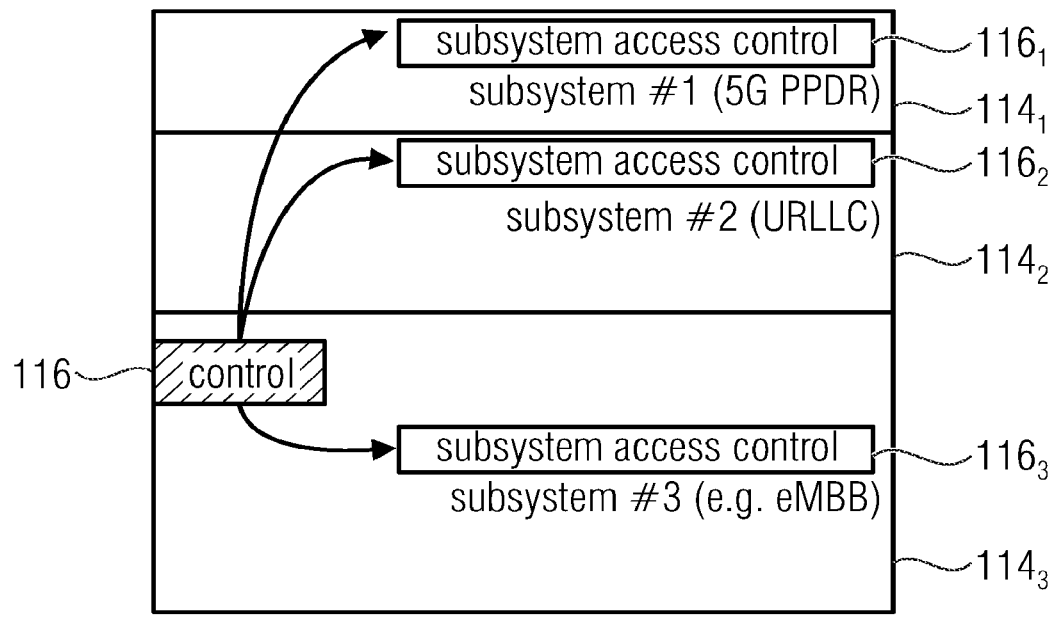
FIG. 8 shows an embodiment in which the system information blocks are split into general control information for all UEs, and additional control information for the different subsystems.

In accordance with a fifth embodiment of the BAC, an access is only allowed if access control information of the subsystem has been obtained. A subsystem is considered to be barred until the access control information has been obtained. The access control information may be provided using the one or more control information as described above in the first to fourth embodiments. In accordance with further embodiments, the access control information may be obtained via dedicated RRC control signaling. FIG. 8 shows an embodiment in which the access control information is split into general control information 116 for all UEs and additional control information $116_1$ to $116_3$ for the respective subsystems #1 to #3. Like in the embodiments described so far, the general control information 116 for all of the subsystems may be transmitted only on the resources for one of the subsystems, in the depicted embodiment the resources of the subsystems #3. The additional control information $116_1$ to $116_3$ for the respective subsystems #1 to #3 may be transmitted on the resources for the respective subsystem.

For example, for each subsystem supported the general information 116 may inform a UE about the resources, like the frequency band or the carrier(s), to listen to for obtaining the additional control information for the subsystem to which the UE wishes to connect.

This embodiment is advantageous as the additional access barring information $116_1$ to $116_3$ for the respective subsystem provides more detailed information. For example, besides limiting access to the subsystem, further limits with regard to accessible services, for example, conversational services, or further limits with regard to allowed UE types, such as devices of security services, public utilities or staff of the network operator, may be provided. Also, when operating the system or parts thereof in the second operation mode, it may be beneficial not to bar all other subsystems or all other services; rather, some services may still be allowed, for example, emergency calls for public users.

In accordance with a sixth embodiment of the BAC, the control information 116 may include an indicator that a public warning message exists. The existence of such a public warning message may trigger a UE to read additional barring information, such as those described above with reference to the fifth embodiment. Public warning messages are basically known in the 2G/3G/4G systems, for example, for issuing earthquake warnings or tsunami warnings. In the system block information, for example, a bit may be provided that indicates that further system information relating to the public warning message are available and may be read. In the table below, an example for the indicator is given. When activated or set, before granting access the UE needs to read the additional access barring information, and on the basis of this information access is finally granted or not.

| Indicator | Meaning |
| --- | --- |
| Read Additional Public Warning Message Information | Read/read not additional access barring information before accessing the system |

It is noted that the access control in the warning or error indicator messages may be combined so that, for example, in case an access is blocked, the user may get a message that indicates the cause for the blocking. The broadcast message content may include a message referring to an emergency situation, or an overload situation, or a certain event at a certain date and for a certain duration, or changes in a service using the logical radio access network, or a certain day and/or night time.

In accordance with a seventh embodiment of the BAC, the inventive control access approach includes a system load indicator query for UEs of a specific subsystem. For example, when considering a PPDR subsystem, PPDR UEs may query the system load during the access phase so as to indicate the number of UEs/the percentage of cell load of PPDR UEs in the cell. Based on this information, the PPDR UEs within the same zone may connect to a master PPDR UE which is itself connected to the wireless communication system, for example, to a base station such as a macro base station or a micro base station. The master PPDR UE is also connected to one or more slave PPDR UEs within the same coverage zone and may communicate with these slave devices in a device-to-device manner, for example, over the PC5 interface. This approach is advantageous as it allows multiple UEs of a specific type qualifying for the specific subsystem to connect to the system via the master UE.

Figure 9:
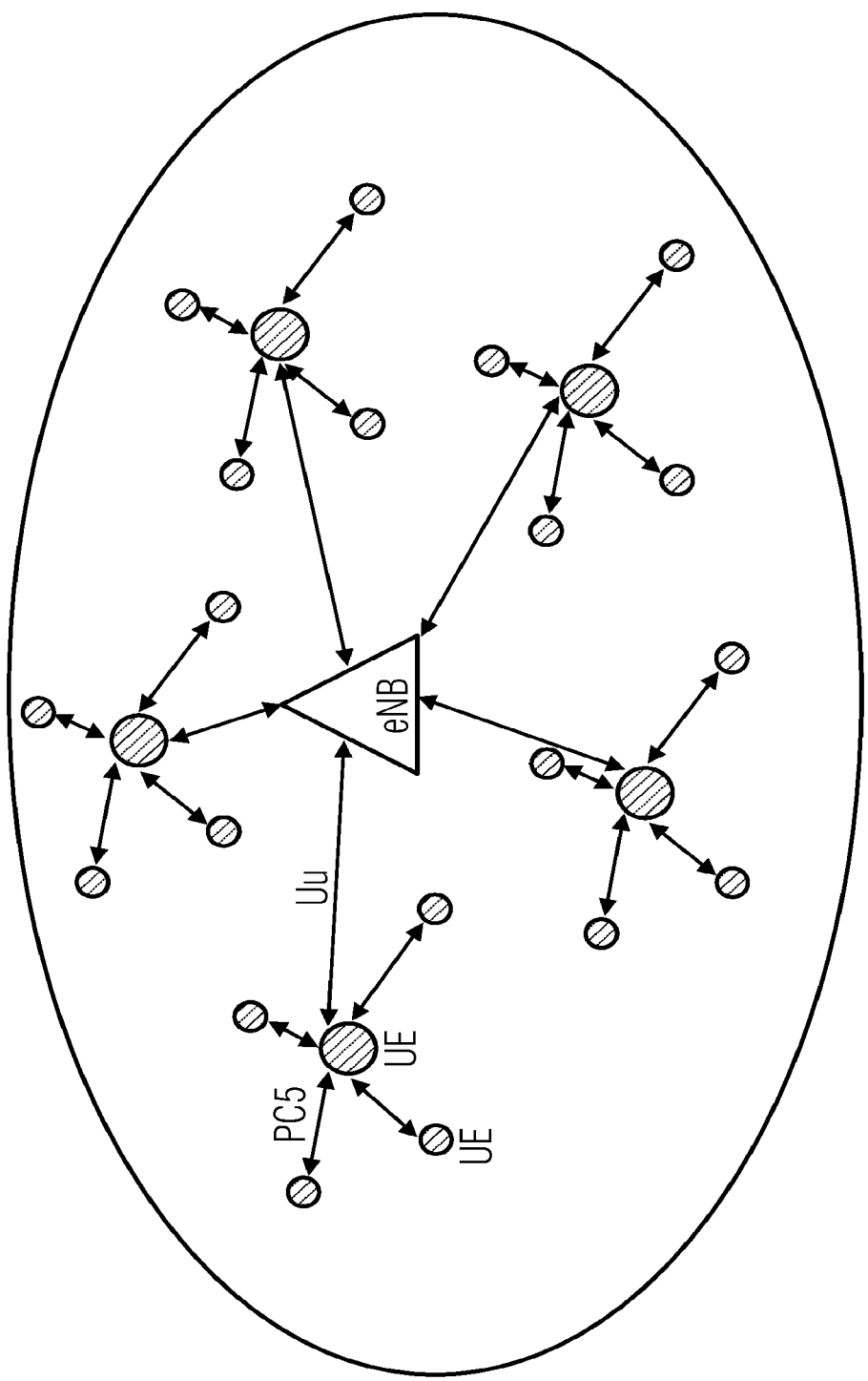
FIG. 9 shows a location specific group access in accordance with an embodiment of the present invention.

In accordance with an eighth embodiment of the BAC, the inventive access control approach may allow for a location specific access. For example, in public safety situations, ubiquitous access to the network may be crucial. Access to the network may be achieved via a direct connection to the base station or via device-to-device (D2D) connections over a directly connected UE, as indicated, for example, in the seventh embodiment described above. Even in the case of the seventh embodiment or in other situations, direct access to a base station may be limited, and access control information in the UE may force the UE to first check if the connection via D2D with neighboring UEs may be achieved. FIG. 9 shows an example for a location specific group access in accordance with the eighth embodiment. FIG. 9 shows a cell including a base station eNB and a plurality of users UE that are directly connected to the base station, as is indicated by the arrow "Uu". In case one of the users within the cell recognizes that it is not possible to directly access the base station, in accordance with the inventive access control scheme of the eighth embodiment, the UE may include access control information forcing the UE try to make a D2D connection, for example, via the PC5 interface, to a neighboring UE. In FIG. 9, such connections are indicated by the arrow "PC5". This approach may be beneficial, for example, when specific areas of the cell are crowded so that access to the base station from this area of the cell is limited by the base station to a reduced number of UEs. In such a case, to allow other UEs to also access the network, the UEs may connect to the base station via the master UE. The information regarding the access control to be stored in the UE may indicate that an indirect connection is possible so that when the respective information is enabled or a bit is set in the information block, the UE not in a position to make a connection to the base station, tries to connect via D2D to directly connect to UEs, as indicated in the table below.

| Indicator | Meaning |
| --- | --- |
| Indirect connection enforced | Try connecting via D2D to directly connected UEs. |

The master user equipment may relay certain information from the logical radio access network to one or more blocked slave users. The relayed information may include:
(1) relay control and/or data channels in the downlink direction, or
(2) relay control and/or data channels in the uplink direction, or
(3) both (1) and (2).

Second Aspect

In the embodiments described thus far, the new access control parameters described above have been provided or introduced on a per-subsystem basis. However, the invention is not limited to such an approach; rather, in accordance with a second aspect of the inventive approach, the access control may be split into a first part, which is referred to as the basic access control (BAC), and a second part, which is referred to as the detailed access control (DAC). The BAC and the DAC may both be part of the system information, e.g. in the SIB, provided to a UE when connecting to the system.

The BAC defines a first set of access control parameters, for example, those described above with reference to FIG. 4 to FIG. 9. The BAC may be part of the control information 116 described in the embodiments above, and may be delivered on the resources for one of the subsystems, also referred to as an anchor subsystem. The DAC defines a second set of access control parameters. The DAC includes additional access control parameters for one or all of the subsystems. In accordance with embodiments, the DAC for the different subsystems may be provided using the resources of the anchor subsystem. In accordance with other embodiments, the DAC for a subsystem may be provided using resources assigned to the corresponding subsystem.

Figure 10:
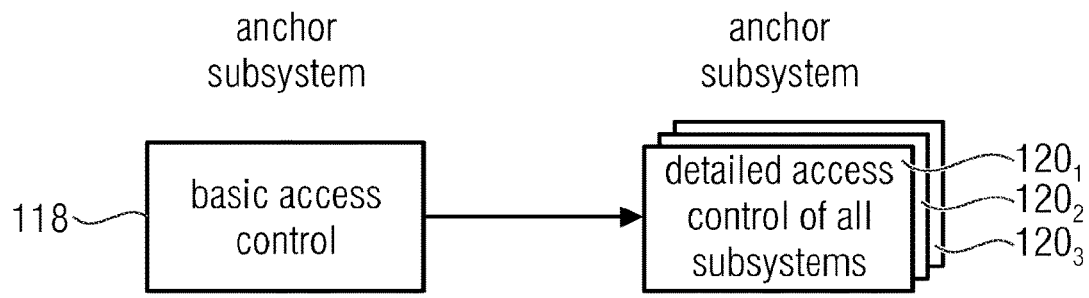
FIG. 10 schematically shows an access control hierarchy using a basic access control and a detailed access control in accordance with embodiments of the present invention.

FIG. 10 schematically shows the access control hierarchy using a BAC and a DAC in accordance with a first embodiment of the second aspect of the present invention. The BAC and the DACs may be provided as part of the control message 116 described above. The BAC 118 and a plurality of DACs $120_1$ to $120_3$ for the subsystems is provided by using anchor subsystem.

Alternatively the Basic Radio Access Control (BAC 118) is part of the Radio Resource Control system information that is broadcasted, while the detailed access control (DAC 120) is part of dedicated RRC signaling or part of the Non-Access Stratum protocol. During the initial attach procedure (see for example FIG. 7(a)) the BAC with a pre-configured or default DAC is used. This initial attach procedure may be performed based on cell wide BAC system information without any dedicated signaling. Once the UE access is authorized, the UE will connect to the base station and the network, which will provide additional detailed access control parameters (see for example FIG. 7(b)). Any following access attempt may consider the BAC information together with the network configured DAC information. This procedure allows for a fast initial access with minimum signaling overhead based on a basic access control, while any other access in the future also allows for more detailed configurations of the access control.

Figure 11:
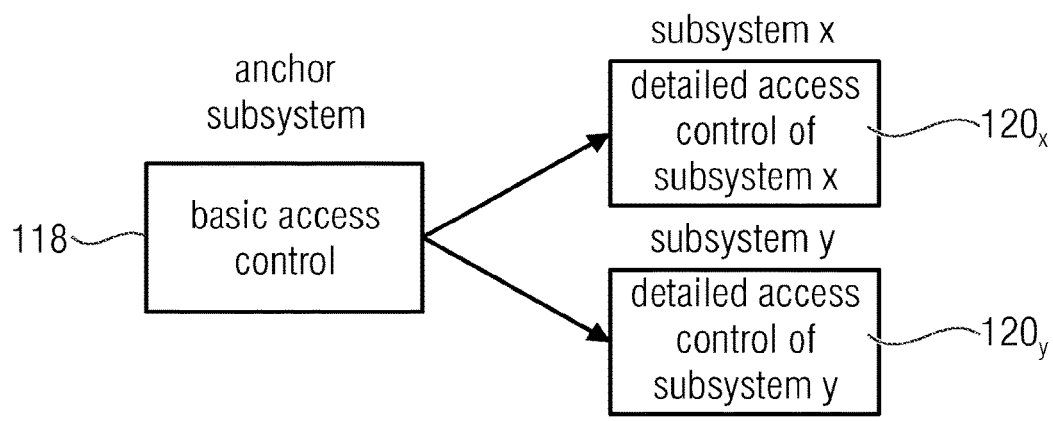
FIG. 11 schematically shows an access control hierarchy with detailed access control information provided by the subsystems in accordance with embodiments of the present invention.

In accordance with a second embodiment, the DAC information may be provided within each subsystem using resources assigned to the corresponding subsystem. FIG. 11 shows the access control hierarchy in accordance with the second embodiment with DAC information provided by the respective subsystems. Other than in FIG. 10, the BAC is provided using resources allocated to the logical RAN for the anchor subsystem, while the DAC $102_x$, $120_y$ for the respective subsystems x and y are signaled using resources allocated to the logical RANs of the respective subsystems x and y.

In case a UE is to be connected to one or more of the subsystems, it reads the DAC of each of the respective subsystems. Alternatively each subsystem is mapped to an access category.

In accordance with an embodiment of the inventive approach, the DACs per subsystem may be scheduled in a time division multiplexing (TDM) fashion on different frequencies which allows the UE to receive the DAC using a single receiver in a sequential manner which avoids the need to implement multiple receivers at the UE that work on different frequencies in parallel.

In the following, an embodiment for acquiring the overall system information in a wireless communication system, such as a 5G system is described with reference to FIG. 12. The process is performed once the basic cell search and synchronization have been completed by a UE that is about to connect to the wireless communication system. First, a MIB 122 is acquired. The MIB 122 may contain basic configuration parameters, such as system bandwidth, system frame number, antenna configuration etc. Once the MIB 122 has been read, one or more essential system information blocks 124, in the following referred to as essential SIB, are acquired. The essential SIB 124 includes the BAC 118 (see FIG. 10 and FIG. 11). The acquisition of the system information may be complex and may take some time for the UE. The process may need to be repeated regularly in each cell and after certain events, such as the interruption of a connection, a re-establishment or the like. The advantage of splitting the access control into BAC and DAC is that the UE may access the system once the BAC has been successfully received via the essential SIB 124. It is not needed to wait for all of the DAC parameters forwarded by other SIBs $126_1$ to $126_n$. This speeds up the connection set-up process and reduces the needed processing of the system information at the UE. For example, when the wireless system is in the first operation mode, for example, during a regular operation, the RAN resources are shared, and the UE may perform further connection processes, like a RACH process, to connect to the base station once it has read the essential SIB 124 which include the BAC 118. The other SIBs $126_1$ to $126_n$ may not be transmitted as frequently as the essential SIB 124, which is advantageous in situations of reduced or small bandwidth capacities. Instead of waiting for all other SIBs $126_1$ to $126_n$ to be scheduled eventually, the UE may already request the scheduling of specific SIBs via dedicated system information, for example, using a SIB of a subsystem the UE decides to connect to.

Figure 12:
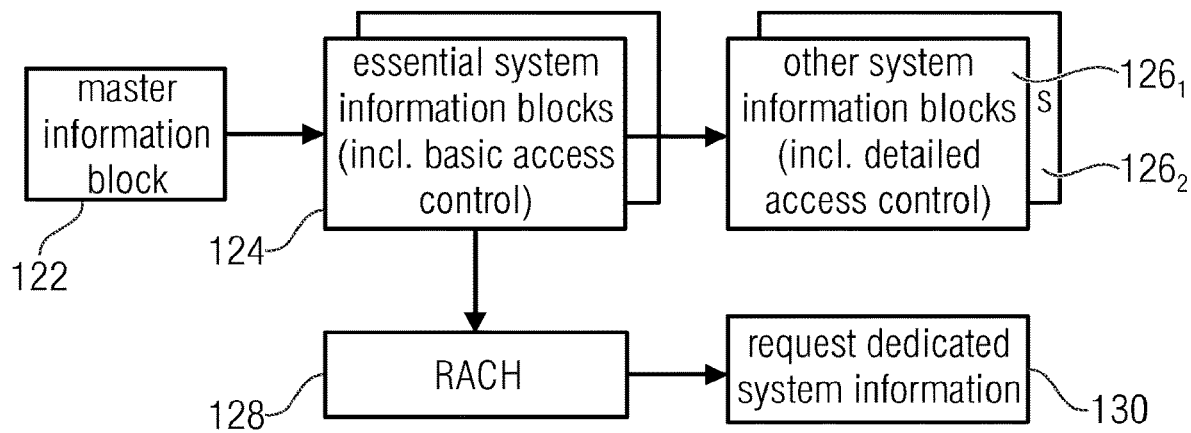
FIG. 12 shows a block diagram for the acquisition of system information in accordance with an embodiment of the present invention.

Thus, as is shown in FIG. 12, in accordance with embodiments of the present invention, the UE acquires the MIB 122 and based on the information obtained in the MIB 112, the UE decodes the essential SIB 124 so as to obtain a first set of access control parameters (BAC). In case the first access control parameter decoding is successful, the UE is allowed to access the system. In case the first access control decoding fails, the UE is forbidden to access the system immediately, and the UE has to decode the other SIB 126 (at least those for the subsystem to be accessed) including a second set of access control parameters (DAC) before accessing the system. Using the DAC information, the base station may limit access to certain users, certain services or certain subsystems as described above with regard to the first aspect. In case the second access control information decoding also fails, the UE is not allowed to access the system or the subsystem at all.

The inventive approach is advantageous in that, when the system is in the first operation mode, like a regular operation, the UE may access the system more quickly by reading only the BAC information which, as explained above, may be limited to only a few bits. Only in case of certain events, which cause the system to be operated in the second operational mode, the procedure involves reading the DAC parameters, for example, for one or more of the subsystems, before the system may be accessed.

Figure 3:
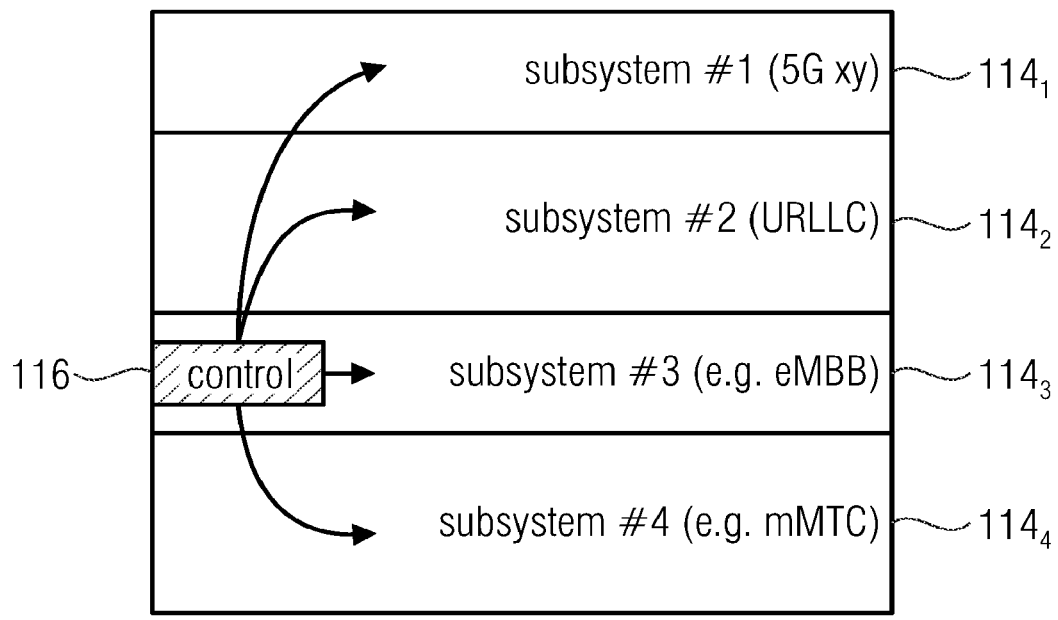
FIG. 3 is a schematic representation of a plurality of logical radio access networks for a wireless communication system implementing logical networks.
Figure 4:
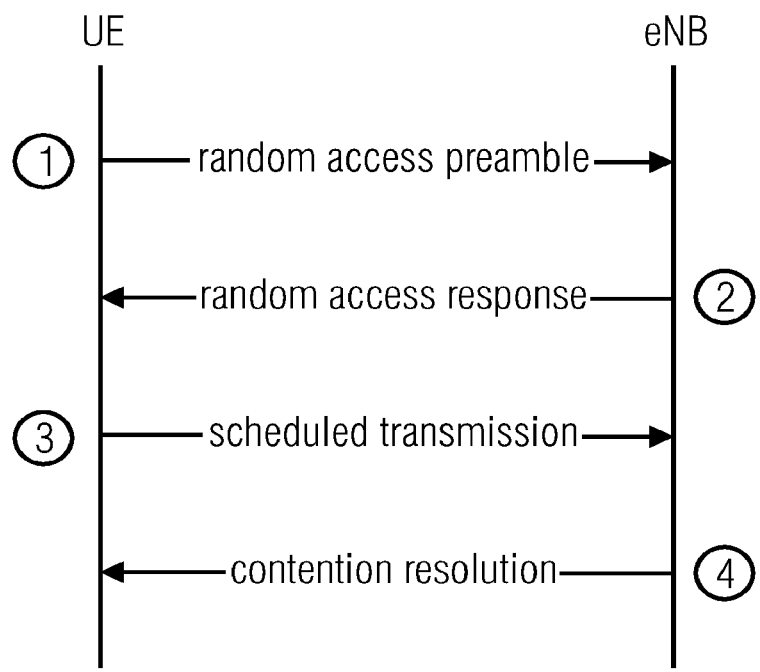
FIG. 4 illustrates a conventional four-step RACH procedure.
Figure 13:
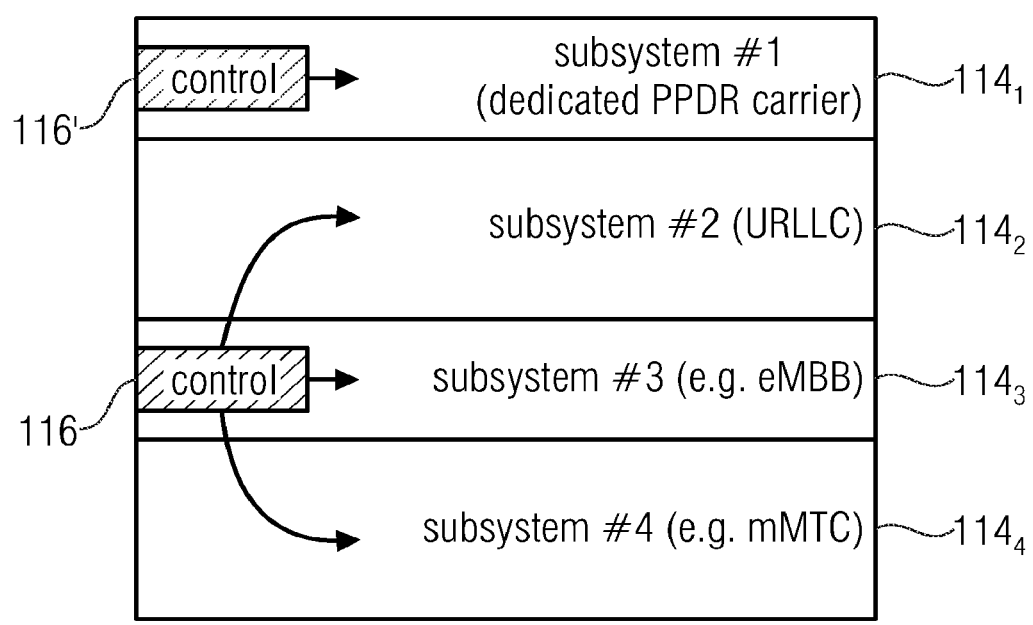
FIG. 13 is a schematic representation for the isolation of control signals and channels for certain subsystems, such as a PPDR (public protection and disaster relief) subsystem.

In accordance with further embodiments, the inventive access control scheme may be implemented to ensure highest reliability for a specific subsystem. This is achieved by isolating resources used for signaling the control information for a specific subsystem completely from the resources of the remaining subsystems. FIG. 13 is a schematic representation for the isolation of control signals and channels for certain subsystems, such as the PPDR subsystem #1. As is depicted in FIG. 13, a system like in FIG. 3 is assumed. When the system is in the first operation mode, resources are shared among the respective subsystems which are to be accessed via the logical radio access networks $114_1$ to $114_4$. The control information 116 for all subsystems is transmitted using the resources of the anchor system #3. However, in case of a certain event or when the system, for other reasons, is operating in the second operation mode, the inventive approach causes a reconfiguration in such a way that isolated resources are used for signaling the control information for one or more of the subsystems. In the embodiment of FIG. 13, it is assumed that the PPDR subsystem #1 is to be isolated, for example, due to an emergency situation. In this case, dedicated control information 116' is signaled on the respective resources for the PPDR subsystem #1 which is sufficient to provide for a basic means of communication, for example, for group calls for rescue forces during a disaster or the like.

To implement the embodiment of FIG. 13, in accordance with further embodiments, the support of the subsystem #1 on the shared resources, such as the shared carriers, is stopped, and the subsystem #1 starts to operate on the isolated, dedicated carriers. In accordance with embodiments, the decision to isolate a certain subsystem may be based on system load per subsystem over the air, for example, the number of certain UEs or certain types connected to a subsystem, the overall or per-user throughput per subsystem, etc., or the load of certain processing resources, for example, processing power or buffer filling, or certain transport resources, for example, the fronthaul or backhaul capacity. A decision to isolate a certain subsystem may also be made by the network side via an interface from the base station to the core network or the operation and maintenance (O&M) center.

In accordance with further embodiments, before support of the PPDR subsystem on the shared resources is stopped, the RRC layer may hand over or redirect all active PPDR UEs, for example, RRC-connected UEs, to the resources now used for the PPDR subsystem #1.

Third Aspect

The embodiments described so far concerned the acquisition of system information in the downlink. After successful access control on the basis of the information acquired in the downlink, the UE is ready to access the system, for example, via the random access channel (RACH) in the uplink. FIG. 12 shows these additional steps for accessing the system. Following a successful acquisition of the system information either in the essential SIB 124 in case of a system operating in the first operating mode, or following the acquisition of the DAC parameters, the RACH procedure 128 is initiated. Once the access procedure has been completed, further dedicated system information 130 may be requested or obtained.

Figure 14:
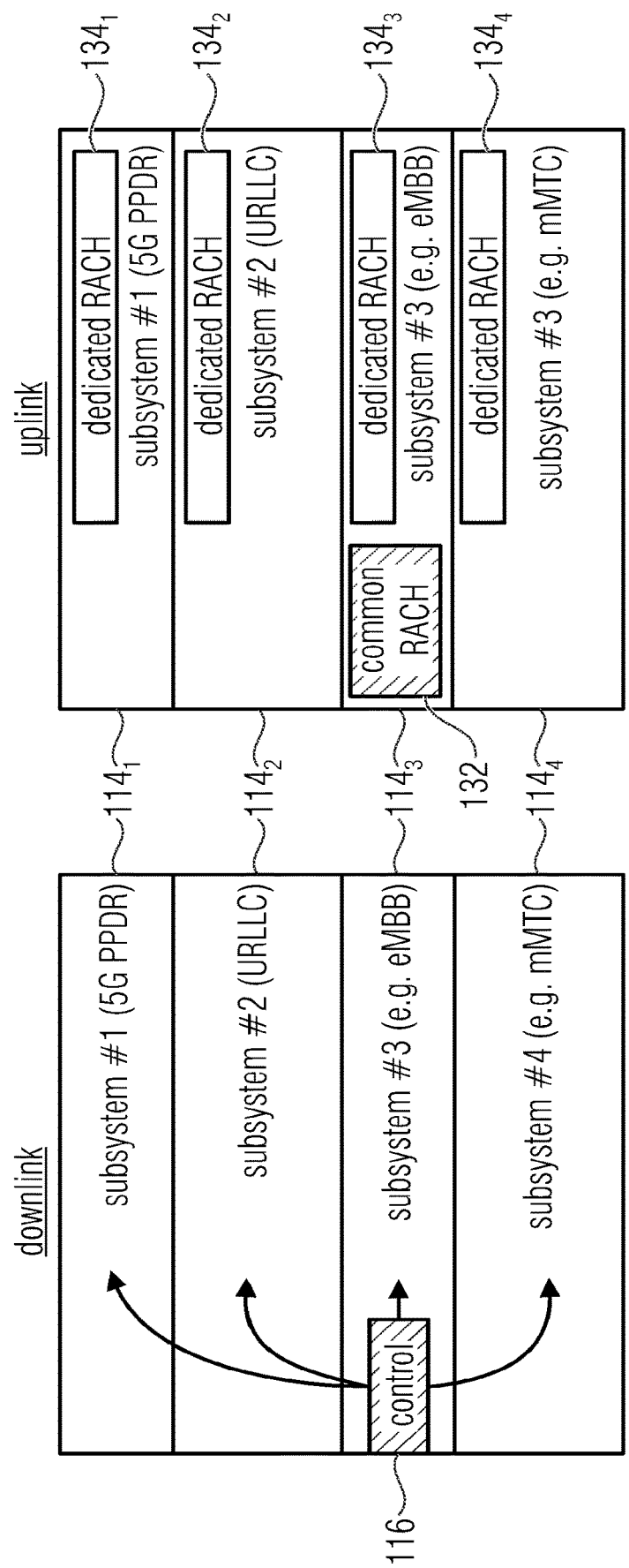
FIG. 14 is a schematic representation of a plurality of logical radio access networks for a wireless communication system implementing logical networks in the downlink and in the uplink.

FIG. 14 shows a schematic representation of the respective logical radio access networks $114_1$ to $114_4$ in the downlink on the left (as in FIG. 3) and in the uplink on the right for the subsystems #1 to #4. In the downlink, the control information 116 may be distributed as described above with regard to the first and second aspects. The base station may allocate resources for a common RACH 132 for all subsystems or may allocate resources for dedicated RACHs $134_1$ to $134_4$ for each of the subsystems #1 to #4. In FIG. 14, the common RACH 132 is shown as having allocated therewith only resources of the logical RAN $114_3$ of the anchor subsystem #3. The common RACH resource 132 may span resources allocated to a plurality of subsystems as the amount of resources involved may be significant. Dependent on the information provided by the essential SIB 124, the UE may not be aware that multiple subsystems are provided at this point of time. During the RACH process, as mentioned above with reference to FIG. 4, collisions may happen and over-provisioning of resources is conventionally provided to limit the probability of collisions. A system may be operated at 1 to 10% RACH load to have a small likelihood of collisions. However, this means that 90 to 99% of the reserved RACH resources are wasted.

Embodiments of the present invention introduce an approach allowing the flexible use of the common RACH 132, the dedicated RACHs $134_1$ to $134_4$ or a combination thereof, also referred to as a hybrid model.

For example, when the wireless communications system or parts thereof operate in the first operation mode, e.g., during a regular operation, RACH overload is considered unlikely, and the common RACH 132 may be used. The common RACH 132 may be used differently by the one or more of the subsystems, dependent on subsystem specific parameters. For example, mMTC UEs may support a narrow-band RACH transmission with several retransmissions, while eMBB or URLLC UEs use wide-band RACH transmissions that are faster. Different UE types may use the same resources; however, different radio parameters may be used. These parameters may be provided via system information or may be hardcoded by the system standard, for example, a maximum bandwidth supported by mMTC UEs is defined to be 180 kHz (IoT devices), while eMBB UEs support a bandwidth of 20 MHz or more. Other RACH parameters that may vary between the subsystems, although the same RACH resources are used, may be a subsystem-specific RACH transmit power, RACH power increase parameters and repetition or backoff parameters.

In accordance with embodiments, the base station may monitor the load of the cell, for example, a number of connected UEs, an overall throughput or the PRB usage, as well as the load of the common RACH resources, for example, based on the number of successful RACH receptions. Once the load exceeds a certain threshold, a high load situation may be identified and the system may react in different ways. In accordance with a first embodiment, if the common RACH resources are overloaded, the number of resources assigned for the common RACH 132 may be increased. In accordance with another embodiment, the inventive access control described above may be actuated so as to restrict or bar any new access attempts by the UEs.

In accordance with an embodiment of the inventive approach, in a load situation the system may switch from providing the common RACH 132 for all subsystems to a system which uses dedicated RACHs $134_1$ to $134_4$, or that uses a hybrid model using both the common RACH 132 and the dedicated RACHs resources $134_1$ to $134_4$. For example, at high load, the base station may decide to configure dedicated RACHs for one or more of the subsystems. All UEs from that subsystem starts using the dedicated RACHs. The common RACH may be located in the anchor system, while the dedicated RACH may be located within the other subsystem.

In accordance with further embodiments, when applying the hybrid model, the common RACH 132 may be used for an initial access only, and the dedicated RACHs $134_1$ to $134_4$, may be used for UEs that have been connected already, for example, those UEs that have been configured with a dedicated RACH resource via the system information or that had enough time to read all the system information. Dependent on the establishment cause of the RACH, for example, the kind of control signaling such as connection set-up, connection re-establishment, handover, tracking area update, the UE may use the common RACH or the dedicated RACH. For example, when the UE sends a RRC connection set-up message in a new cell, it may use the common RACH to access the cell or it may use the dedicated RACH for a RRC connection re-establishment. In the first case, the dedicated RACH may not be known to the UE at this time as the system information has not yet been received.

Figure 15:
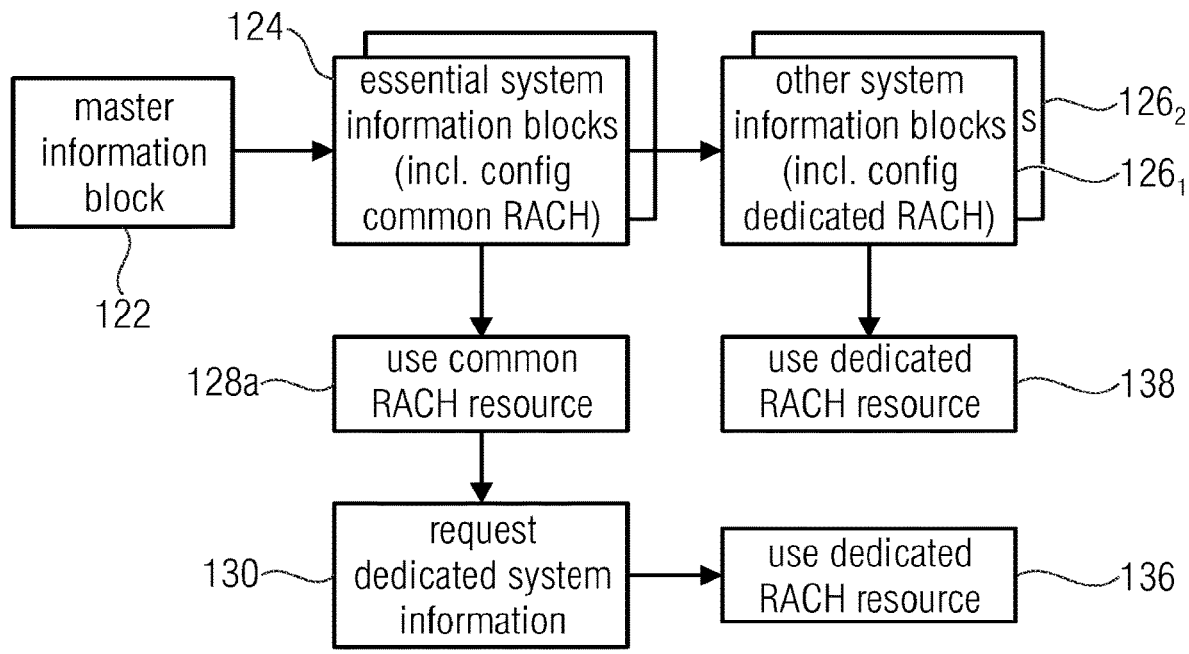
FIG. 15 schematically shows the acquisition of system information for the use of RACH resources.

In another embodiment, the signaling of the resource indication of the common RACH may be part of the essential SIBs and the dedicated RACH resources may be signaled via the other SIBs at a later time and/or at a different frequency. This is schematically depicted in FIG. 15 showing the acquisition of system information for the use of RACH resources. Initially, the MIB 122 is obtained followed by acquiring the essential SIB 124. At a later point in time, the other SIBs $126_1$ to $126_n$ may be obtained. In case the UE is able to access the system on the basis of the essential SIB 124, it uses the common RACH as is indicated at 128a. Once the RACH procedure is completed, the dedicated system information may be requested as indicated at 130, and the UE may be informed that, for example, for a specific one of the subsystems or for all of the subsystems dedicated RACHs may be used, as is indicated at 136.

In case access to the system on the basis of the essential SIB 124 is not possible, the UE, as outlined above, obtains the other SIBs 126 on the basis of which access to the system may be performed. If access is possible, the UE is further signaled to use dedicated RACHs for the connection set-up, as is indicated at 138. In this embodiment, the other SIBs may include the additional information about the dedicated RACHs.

In terms of signaling overhead, it is advantageous if the signaling periodicity of the essential SIBs, which include the information about the resources for the common RACH, also referred to as common RACH resources, is higher than the signaling periodicity of the other SIBs $126_1$ to $126_n$, which include the information about the resources for the dedicated RACH, also referred to as the dedicated RACH resources. The UEs with time critical control information or service requests saves time as they may use the common RACH instead of the dedicated RACH. Further, more frequent signaling of the system information, due to the resource aggregation of multiple subsystems, the common RACH may have a larger resource pool than a dedicated RACH, i.e., the RACH resources are scheduled more often thereby reducing the overall latency for delay-critical applications and services.

As mentioned above, UEs that use the common RACH to connect to the base station may also request more system information via the dedicated RRC signaling, for example, additional system information concerning the dedicated RACH resource configuration or the configuration of another subsystem containing a dedicated RACH resource.

In accordance with further embodiments, the RACH preamble sequence space may be split, i.e., the common RACH resource may not make use of all preambles, but certain preambles are set aside for the dedicated RACH resources. In a conventional RACH design (see 3GPP TS 36.211), there are already different sets of preambles. A UE may select its preamble sequence dependent on the data quantity to be sent or based on its channel quality. This concept may also be used for the respective subsystems when implementing network slicing.

In accordance with yet further embodiments, the essential SIB information is limited in that rather than explicitly indicating the common RACH resources in the essential SIB, for providing fast access, the existence of dedicated RACH resources is indicated, as is shown in the table below.

| Indicator | Meaning |
| --- | --- |
| eMBB Dedicated RACH | existing/not existing |
| URLLC Dedicated RACH | existing/not existing |

-continued

| Indicator | Meaning |
| --- | --- |
| mMTC Dedicated RACH | existing/not existing |
| PPDR Dedicated RACH | existing/not existing |

A specific service or a specific UE type may case the UE to the common RACH or the dedicated RACH. For non-delay critical service types, the UE may use the dedicated RACH, i.e., the UE waits until it knows the dedicated RACH and until the time instance a RACH resource is scheduled. For example, when considering a PPDR subsystem, reliability is of higher importance that the latency until a call is set-up. Therefore, although the MIB and SIB are sent over resources allocated to an anchor subsystem which are shared with other subsystems, the dedicated RACH may be configured continuously so that the overall downlink control overhead is reduced while still providing highest reliability. The base station may provide the dedicated RACH resources at certain time intervals. The time interval may be either fixed for a certain slice with a default value, or may be altered via a message from the core network, e.g. O&M entity within the core network.

In accordance with further embodiments, the common RACH may not support all RACH formats. For example, mMTC UEs or devices may operate in different coverage enhancement modes to provide deep indoor coverage. For such devices, an higher link budget is needed to connect to the system, and the common RACH are not optimized for providing an extreme coverage. To obtain the needed link budget an mMTC device may limit its transmission bandwidth to concentrate its power to a small set of resources. Furthermore, it may entail a large number of retransmissions to connect to the system. While the common RACH resource may be used for the basic coverage, the dedicated RACH resource may support some of the extreme coverage enhancement modes. In accordance with other embodiments, there may be low complexity devices that have characteristics different from that of common devices and that may also need dedicated RACH resources. Examples of such low complexity UEs may be UEs with a single antenna, with half duplex only operation, with reduced transmission bandwidth and reduced processing capabilities, i.e., peak data rates.

In accordance with further embodiments, in specific situations it may be desired to provide for a RACH resource isolation. For example, for PPDR subsystems there may be known events when it is needed to isolate resources for the RACH process so as to allow for a reliable communication among the involved forces. In a similar way, at mass events, the load of the system may be high so that a RACH overload cannot be excluded completely even when applying the inventive adaptive access control. In such cases, some subsystems may use dedicated RACH resources in the uplink while they share resources in the downlink. In such a case the existence of a dedicated RACH resource may need to be signaled explicitly by the essential SIB.

In accordance with the embodiments described above, making use of dedicated RACH resources which may be configured adaptively, the system information needs to be updated accordingly. In accordance with embodiments, the UEs served by a base station may be notified about the change of system information by a corresponding system information change notification and/or by respective value tags of the system information. Once the UE has read the respective new system information, it starts to use the newly configured dedicated RACH resources.

Figure 16:
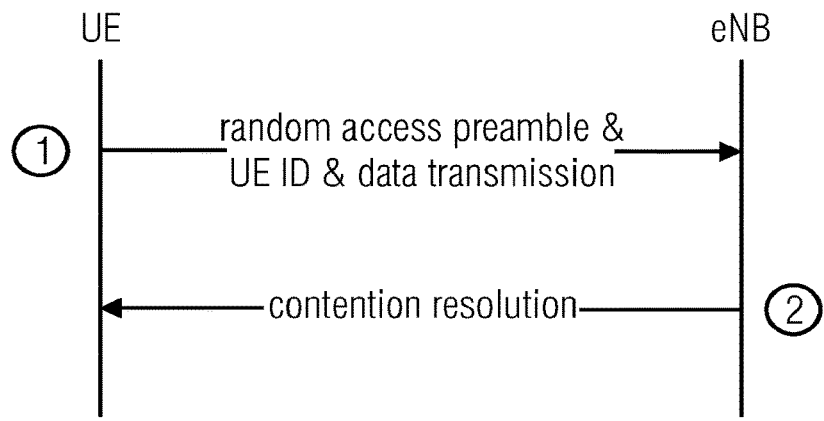
FIG. 16 is a schematic view of a two-step RACH procedure in accordance with an embodiment of the present invention.

In accordance with yet further embodiments, due to the different requirements of the different services provided by the respective subsystems, for example, in a 5G system, different RACH procedures for different subsystems may be used. Besides, the above described four-step RACH procedure, as it may be used in accordance with conventional approaches, such as the LTE approach, there may also be a two-step RACH procedure for ultra-low latency services. FIG. 16 is a schematic view of a two-step RACH procedure in accordance with an embodiment of the present invention. While in the conventional four-step procedure described above, only a preamble is sent in the first message, in accordance with the present embodiment, the two-step procedure shown in FIG. 16 already conveys first uplink information such as the UE identity, a buffer status report and further first data in the first message ①. This may be considered as a combination of the conventional messages ① and ③ in a single message. In a similar way, the downlink response in the new message ② already contains the content resolution of the conventional downlink message ④.

In accordance with embodiments, the base station may configure different RACH procedures for different subsystems, and the UE may first connect to the network using the conventional four-step RACH procedure on the basis of the common RACH resources signaled in the essential SIB on the anchor subsystem. Once connected, the UE may obtain additional control information via the other SIB. The additional control information may contain the two-step RACH procedure. The physical RACH resources between the conventional and the two-step procedure may be the same or may be different resources.

Dependent on the UE's configuration or dependent on the configuration of a subsystem, the UE may use either the two-step or the four-step RACH procedure. For instance, a UE using URLLC services may use the two-step RACH procedure once it is connected to the subsystem and configured. In some subsystems, both procedures may be available for the same UE, and there may be other criteria regarding which procedure is to be used. For example, the two-step RACH procedure may be used in a certain UE state, for example, the RRC inactive state. In accordance with other embodiments it may be used for the transmission of small packets and the base station may signal the size of the packet that can be transmitted via the two-step RACH procedure. In accordance with yet other embodiments, the two-step RACH procedure may be used to speed up certain RRC control messages, for example, a state transition from RRC inactive to RRC connected.

Figure 17:
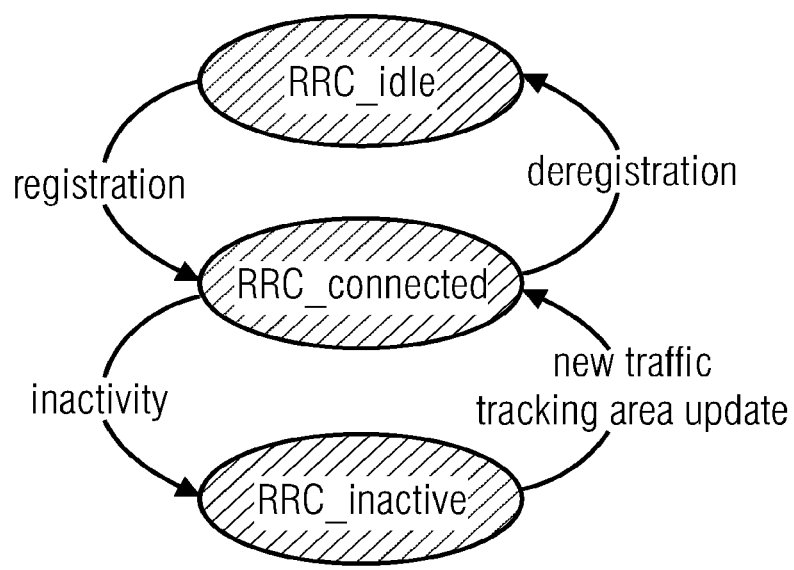
FIG. 17 schematically represents an RRC state model for a wireless communication system, such as a 5G system.

In accordance with further embodiments of the present invention, there may be different RRC states per subsystem. In a conventional system, such as the LTE system, a system only has two states, namely, RRC connected and RRC idle, as is depicted in FIG. 17 schematically representing an RRC state model for a wireless communication system, such as a 5G system. In the RRC connected state, the UE may transmit and receive data via the shared channel. The UE has a UE identity and the location is known at the cell level. The mobility is handled by the base station based on UE measurements. The state RRC idle is conventionally used when there is no ongoing data transmission. The UE may only receive paging in the downlink and may only use the RACH in the uplink to connect to the system, and in this state, the UE is not known at the eNB or base station, does not have an UE identity and its location is known at the paging area level. In accordance with the inventive approach, additional states are added, for example, the RRC inactive state. The state may be used to transmit infrequent small packets. The benefit is that the UE does not have to go from the RRC idle state to the RRC connected state for sending a small packet. In such a case the number of control messages to be exchanged and the size of the control data may be larger than the actual packet size.

In accordance with further embodiments of the present invention, the UE may not use all of the existing states when being connected to a certain subsystem. For example, a UE using the eMBB system may not need the RRC inactive state as there are no small packets to be transmitted. Either the use of such states may be generally restricted for UEs using such a subsystem, for example, this may be implicitly hardcoded in the specification for certain UE types or services, or some states may be restricted per subsystem on the basis the control information. For example, when considering a PPDR subsystem, the reliability is of higher priority than power saving, and the PPDR subsystem may ask the UEs to remain in the RRC connected mode during a certain event, for example, during a mission critical operation, for a given time or generally. The control of the RRC state restrictions may be adaptive as part of the RRC based on triggers from the radio access layers, or may be based on certain load criteria or may be based on information obtained from the core network or the operation and maintenance server.

Figure 2:
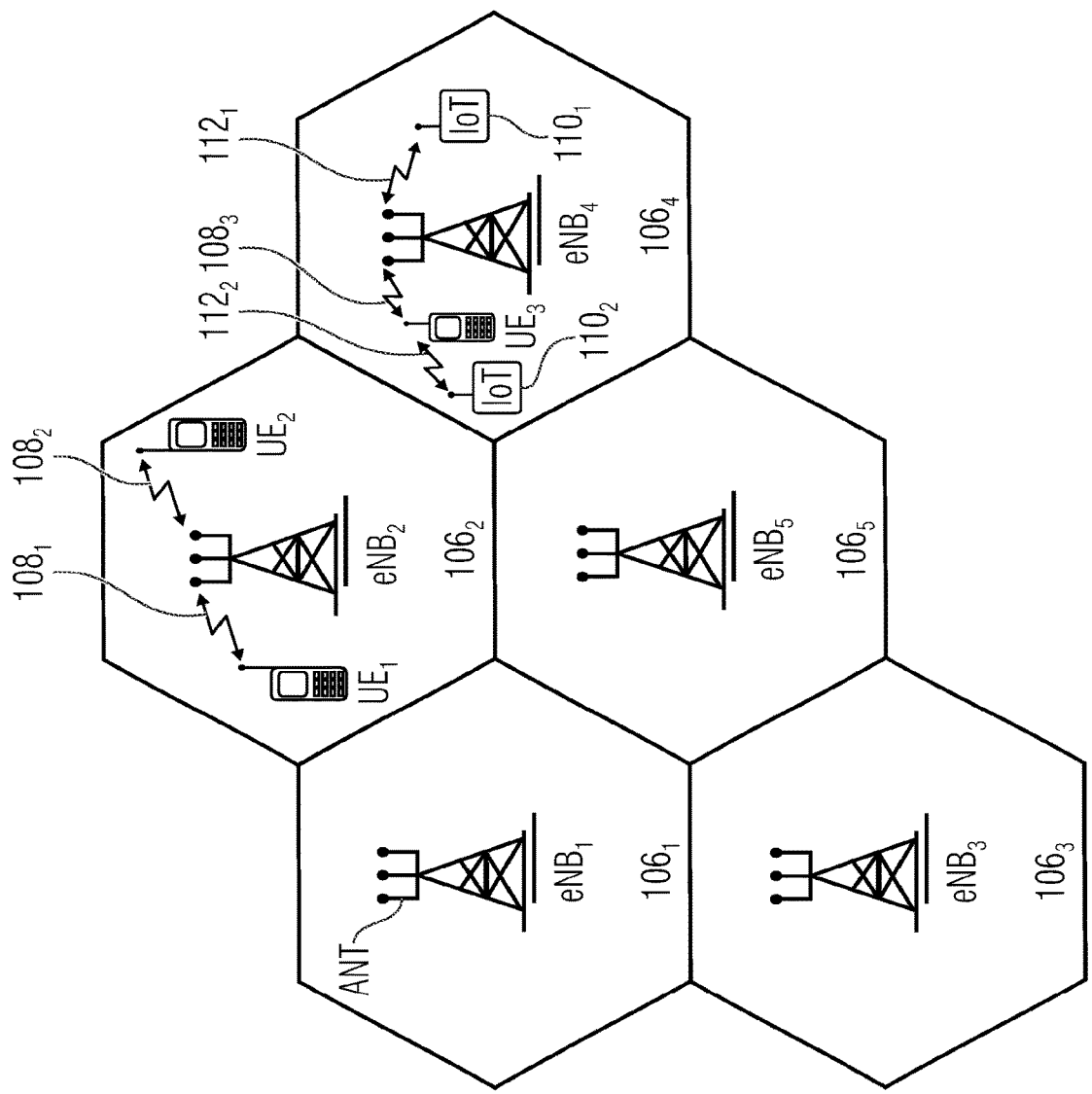
FIG. 2 shows a schematic representation of an example of the wireless network or wireless network infrastructure of the wireless communication system of FIG. 1.
Figure 18:
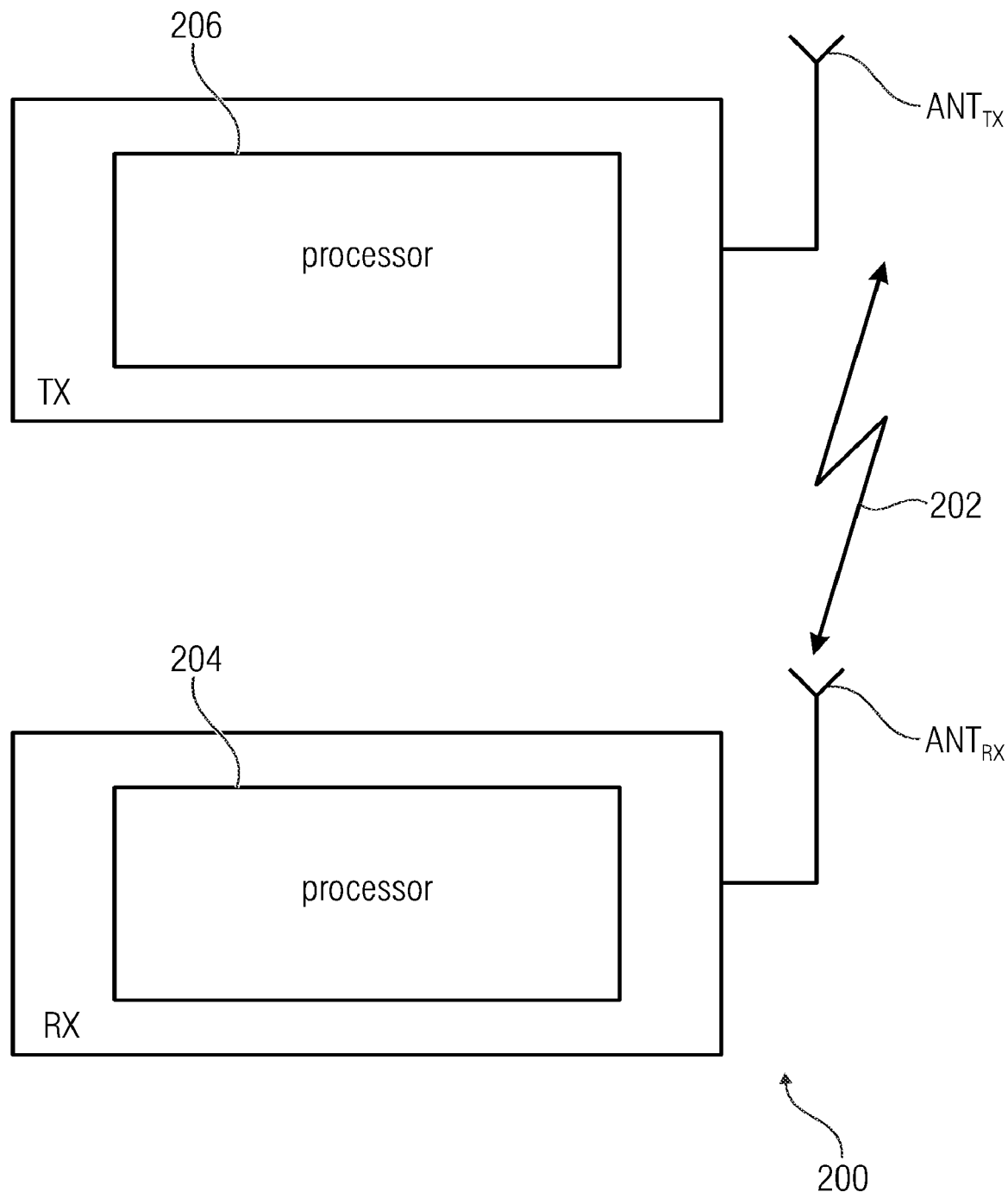
FIG. 18 is a schematic representation of a wireless communication system for communicating information between a transmitter and a receiver.

Embodiments of the present invention may be implemented in a wireless communication system as depicted in FIG. 2 including base stations, users, like mobile terminals or IoT devices. In accordance with embodiments, the user or the user equipment may be a device implemented inside a moving vehicle, like a moving vehicle, e.g., a car or a robot, or inside a flying device, e.g., an unmanned aerial vehicle (UAV) or a plane. FIG. 18 is a schematic representation of a wireless communication system 200 for communicating information between a transmitter TX and a receiver RX. The transmitter TX may include one or more antennas $ANT_{TX}$ or an antenna array having a plurality of antenna elements. The receiver RX may include one or more antennas $ANT_{RX}$. As is indicated by the arrow 202 signals are communicated between the transmitter TX and the receiver RX via a wireless communication link, like a radio link. The wireless communication system may operate in accordance with the techniques described herein.

For example, the receiver RX, like a UE, is served by the transmitter TX, like a base station, and may access at least one of the logical radio access networks of the wireless communication network. The receiver RX receives via the one or more antennas $ANT_{RX}$ a radio signal from the transmitter TX. The radio signal includes a control signal which indicates the physical resources of the wireless communication network assigned to the logical radio access network and/or access control information for the receiver RX for accessing the logical radio access network. The receiver RX includes a signal processor 204 to process the control signal from the base station. The transmitter TX serves the receiver RX in the cell of the wireless communication network having the plurality of logical radio access networks. The transmitter TX communicates, via the one or more antennas $ANT_{TX}$, a plurality of users, like the receiver RX, to be served by the base station for accessing one or more of the logical radio access networks. The transmitter TX includes a signal processor 206 to generate the control signal to selectively control the physical resources of the wireless communication network assigned to the logical radio access networks and/or to control access of the users or user groups to one or more of the logical radio access networks.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 19:
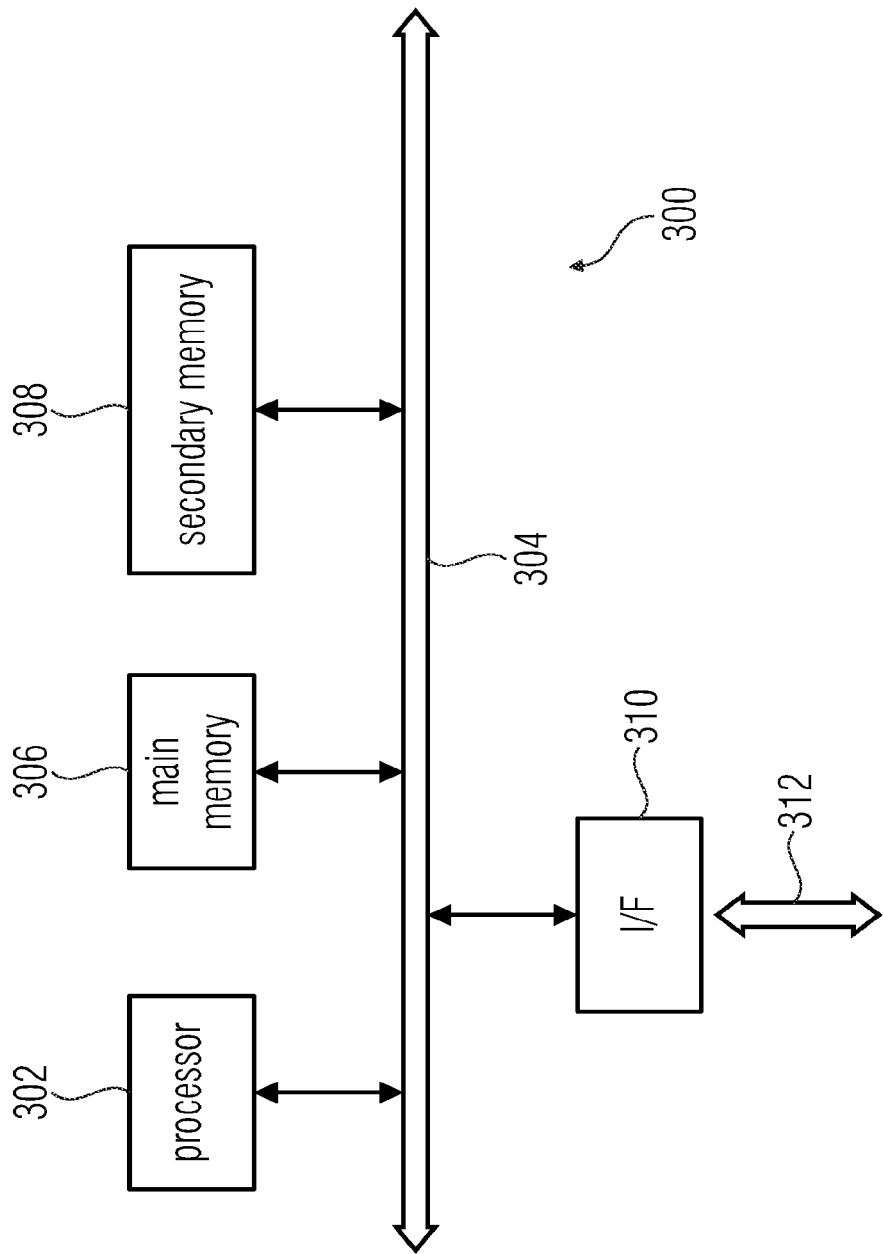
FIG. 19 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 19 illustrates an example of a computer system 300. The units or modules as well as the steps of the methods performed by these units may execute on one or more computer systems 300. The computer system 300 includes one or more processors 302, like a special purpose or a general purpose digital signal processor. The processor 302 is connected to a communication infrastructure 304, like a bus or a network. The computer system 300 includes a main memory 306, e.g., a random access memory (RAM), and a secondary memory 308, e.g., a hard disk drive and/or a removable storage drive. The secondary memory 308 may allow computer programs or other instructions to be loaded into the computer system 300. The computer system 300 may further include a communications interface 310 to allow software and data to be transferred between computer system 300 and external devices. The communication may be in the form electronic, electromagnetic, optical, or other signals capable of being handled by a communications interface. The communication may use a wire or a cable, fiber optics, a phone line, a cellular phone link, an RF link and other communications channels 312.

The terms "computer program medium" and "computer readable medium" are used to generally refer to tangible storage media such as removable storage units or a hard disk installed in a hard disk drive. These computer program products are means for providing software to the computer system 300. The computer programs, also referred to as computer control logic, are stored in main memory 306 and/or secondary memory 308. Computer programs may also be received via the communications interface 310. The computer program, when executed, enable the computer system 300 to implement the present invention. In particular, the computer program, when executed, enable processor 302 to implement the processes of the present invention, such as any of the methods described herein. Accordingly, such a computer program may represent a controller of the computer system 300. Where the disclosure is implemented using software, the software may be stored in a computer program product and loaded into computer system 300 using a removable storage drive, an interface, like communications interface 310.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A device comprising:
   a communication circuit,
      wherein the communication circuit is arranged to communicate with a plurality of user devices,
      wherein at least one of the plurality of user devices is served by the device,
      wherein the least one of the plurality of user devices is provided access to a first portion of a plurality of logical radio access networks,
      wherein the first portion of the plurality of logical radio access networks comprises at least two of the plurality of logical radio access networks; and a control circuit, wherein the control circuit is arranged to selectively control a first portion of the physical resources of a wireless communication network, wherein the first portion of the physical resources is assigned to the first portion of logical radio access networks, wherein the device is arranged to allow access to the at least one of the plurality of user devices to the first portion the plurality of logical radio access networks during a first operation mode, wherein the device is arranged to adaptively limit access of the at least one of the plurality of user devices to the first portion of the plurality of logical radio access networks during a second operation mode.

2. The device of claim 1, wherein at least one of the plurality of logical radio access networks comprises at least one network slice, wherein an information controlling the access of the user devices comprises an access class or an access category.

3. The device of claim 1, wherein the device is arranged to gradually reduce the at least one of the plurality of user devices allowed to access the first portion of the plurality of logical radio access networks.

4. The device of claim 1, wherein the device is arranged to temporarily to bar access to the at least one of the plurality of user devices from the logical radio access network.

5. The device of claim 4, wherein the device is configured to signal to the at least one of the plurality of user devices a barring time, wherein the barring time indicates to the at least one of the plurality of user devices when the at least one of the plurality of user devices should attempt to access the logical radio access network.

6. The device of claim 4, wherein temporarily barring the first portion of the plurality of logical radio access network comprises controlling the at least one of the plurality of user devices to stay on the first portion of the plurality of logical radio access network and to signal to the at least a second one of the plurality of user devices that access to the logical radio access network is temporarily barred.

7. The device of claim 1, wherein the device is arranged to temporarily bar access to the at least one of the plurality logical radio access networks.

8. The device of claim 7, wherein the device is configured to signal to the at least one of the plurality of user devices a barring time, wherein the barring time indicates to the at least one of the plurality of user devices when the at least one of the at least one plurality of user devices should attempt to access the logical radio access network.

9. The device of claim 1, wherein selectively controlling the distribution of the physical resources among the first portion of the plurality of logical radio access networks comprises modifying number of physical resources allocated to the first portion of the plurality of logical radio access network.

10. The device of claim 1, wherein selectively controlling the distribution of the physical resources among the first portion of the plurality of logical radio access networks comprises limiting or suspending at least one service using the first portion of the plurality of logical radio access networks.

11. The device of claim 10, wherein the limiting or suspending at least one service using the logical radio access network the device comprises:

selecting at least one of a plurality of user devices of a service using a service quality; and prioritizing the at least one of the plurality of user devices of the first portion of the plurality of logical radio access networks.

12. The device of claim 1, wherein selectively controlling the distribution of the physical resources among the first portion of the plurality of logical radio access networks comprises increasing a scheduling priority of at least one of the first portion of the plurality of logical radio access networks relative to at least one of a second portion of the plurality of logical radio access networks, or decreasing the scheduling priority of at least one of a second portion of the plurality of logical radio access networks relative to the scheduling priority of the first portion of the plurality of logical radio access networks.

13. The device of claim 1, wherein the second operation mode is determined based on a certain event, wherein the certain event is selected from the group consisting of a certain emergency situation, an overload situation of at least a part of the wireless communication network, a need to balance the load between the logical radio access networks, a need to provide highest resilience to one of the logical radio access networks, a certain event at a certain date and for a certain duration, changes in a service using the logical radio access network, a certain day and/or night time, and a schedule of certain reoccurring events.

14. The device of claim 1,

Wherein the wireless communication network is arranged to enable a plurality of instances for a logical radio access network, wherein the plurality of instances use different carriers, wherein the device is configured to redirect the at least one of the plurality of user devices to the carriers of another instance of the logical radio access network when at least one of the first portion of the plurality of logical radio access networks is barred.

15. The device of claim 1, wherein the device is arranged to selectively control a first portion of the physical resources using a common downlink system information or signaling with a communication protocol, wherein the common downlink system information is provided by the wireless communication network for the at least one of the plurality of user devices, the communication protocol is used by at least one of the plurality of logical radio access networks.

16. The device of claim 15, wherein the device is arranged to signal control information to the at least one of the plurality of user devices whether a certain logical radio access network is supported or is not supported by the wireless communication network, and/or limiting access to a logical radio access network to the least one of the plurality of user devices, and/or barring access at least one of the first portion of the plurality of logical radio access networks; and/or limiting access to specific service types of a service using the first portion of the plurality of logical radio access networks.

17. The device of claim 15, wherein the device is arranged to broadcast to the at least one of the plurality of user devices control information so as to indicate that additional access control information is acquired before access, wherein the additional access control information controls access of the at least one of the plurality of user devices to at least one f the logical radio access networks.

18. The device of claim 15,
wherein, the device is arranged to signal to a master user to connect to slave user devices within the same coverage zone for a communication using a device-to-device interface when access to a logical radio access network is blocked for a third portion of the plurality of user devices,
wherein the master user is connected to the wireless communication network,
wherein the slave user devices comprise a fourth portion of the third portion of the plurality of user devices.

19. The device of claim 1,
wherein the control circuit uses a control signal,
wherein the control signal comprises a first set of access control parameters and a second set of access control parameters,
wherein the device is arranged to broadcast the first set of access control parameters using the RRC protocol and the second set of access control parameters using the NAS protocol.

20. A device comprising:
a communication circuit,
wherein the communication circuit is arranged to communicate with a plurality of user devices,
wherein at least one of the plurality of user devices are served by the device,
wherein the least one of the plurality of user devices is provided access to a first portion of a plurality of logical radio access networks,
wherein the first portion of the plurality of logical radio access networks comprises at least two of the plurality of logical radio access networks; and
a control circuit, wherein the control circuit is arranged to selectively control a first portion of the physical resources of the wireless communication network,
wherein the first portion of the physical resources is assigned to the first portion of the plurality of logical radio access networks,
wherein the device is arranged to allow access to the at least one of the plurality of user devices to the at least one of the plurality of logical radio access networks during a first operation mode,
wherein the device is arranged to adaptively reduce the first portion of the plurality of logical radio access networks during a second operation mode.

21. The device of claim 20, wherein adaptively reducing the first portion of the plurality of logical radio access networks comprises at least temporarily barring the first portion of the plurality of logical radio access network so as to increase the available physical resources for a second portion of the plurality of logical radio access networks.

22. The device of claim 20, wherein adaptively reducing the first portion of the plurality of logical radio access networks comprises allowing access to a portion of the first portion of the plurality of logical radio access networks so as to increase the available physical resources for the at least one of the first portion of the plurality of logical radio access networks.

23. A method comprising:
communicating with a plurality of user devices;
providing access to at least one of the plurality of user devices to a first portion of a plurality of logical radio access networks, wherein the first portion of the plurality of logical radio access networks comprises at least two of the plurality of logical radio access networks;
controlling a first portion of physical resources of a wireless communication network, wherein the first portion of the physical resources is assigned to the first portion of the plurality of logical radio access networks;
allowing access to the at least one of the plurality of user devices to the first portion of the plurality of the logical radio access networks during a first operation mode; and
adaptively limiting access of the at least one of the plurality of user devices to the first portion of the plurality of logical radio access networks during a second operation mode.

24. A computer program stored on a non-transitory medium, wherein the computer program when executed on a processor performs the method as claimed in claim 23.

25. A computer program stored on a non-transitory medium, wherein the computer program when executed on a processor performs the method as claimed in claim 23.

26. A method comprising:
communicating with a plurality of user devices;
providing access to at least one of the plurality of user devices to a first portion of a plurality of logical radio access networks, wherein the first portion of the plurality of logical radio access networks comprises at least two of the plurality of logical radio access networks;
controlling a first portion of physical resources of a wireless communication network, wherein the first portion of the physical resources is assigned to the first portion of the plurality of logical radio access networks;
allowing access to the at least one of the plurality of user devices to the first portion of the plurality of the logical radio access networks during a first operation mode; and
adaptively reducing the first portion of the plurality of logical radio access networks during a second operation mode.

* * * * *